United States Patent
Moses, Jr. et al.

(10) Patent No.: US 10,590,658 B1
(45) Date of Patent: *Mar. 17, 2020

(54) SIDING PANEL ASSEMBLY

(71) Applicant: Associated Materials, LLC, Cuyahoga Falls, OH (US)

(72) Inventors: Charles Bryan Moses, Jr., Hudson, OH (US); Michael Danny Ziemer, Medina, OH (US); Randall Jay Brown, Maineville, OH (US); Nicholas Daniel Thompson, Medina, OH (US); Daniel H. Green, Brecksville, OH (US)

(73) Assignee: Associated Materials, LLC, Cuyahoga Falls, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/283,598

(22) Filed: Feb. 22, 2019

Related U.S. Application Data

(60) Provisional application No. 62/784,141, filed on Dec. 21, 2018.

(51) Int. Cl.
| | | |
|---|---|---|
| *E04F 13/08* | (2006.01) | |
| *E04F 13/075* | (2006.01) | |
| *E04F 13/073* | (2006.01) | |
| *B32B 27/30* | (2006.01) | |
| *B32B 27/20* | (2006.01) | |
| *B32B 7/12* | (2006.01) | |
| *B32B 27/06* | (2006.01) | |

(52) U.S. Cl.
CPC .......... *E04F 13/0866* (2013.01); *B32B 7/12* (2013.01); *B32B 27/065* (2013.01); *B32B 27/20* (2013.01); *B32B 27/304* (2013.01); *E04F 13/073* (2013.01); *E04F 13/075* (2013.01); *E04F 13/0894* (2013.01); *B32B 2262/101* (2013.01); *B32B 2262/14* (2013.01); *B32B 2266/0214* (2013.01); *B32B 2307/734* (2013.01)

(58) Field of Classification Search
CPC ....... B32B 27/065; B32B 7/12; B32B 27/304; B32B 2307/734; E04F 13/0866
See application file for complete search history.

(56) References Cited

U.S. PATENT DOCUMENTS

| | | |
|---|---|---|
| 4,506,486 A | 3/1985 | Culpepper, Jr. |
| 5,678,369 A | 10/1997 | Ishikawa |
| 6,195,952 B1 | 3/2001 | Culpepper |
| 7,040,067 B2 | 5/2006 | Mowery |
| 7,712,276 B2 | 5/2010 | Gilbert |
| 7,762,040 B2 | 7/2010 | Wilson |

(Continued)

OTHER PUBLICATIONS

Grossman, Handbook of Vinyl Formulating, 2008, John Wiley & Sons Inc., Second Edition (Year: 2008).

*Primary Examiner* — Hai Vo

(74) *Attorney, Agent, or Firm* — Knobbe, Martens, Olson & Bear LLP

(57) ABSTRACT

A thermoplastic composite sheet for exterior cladding applications includes an outer layer with a thermoplastic resin composition reinforced with a high aspect ratio filler such that the outer layer has a coefficient of linear thermal expansion of no more than approximately $2.33 \times 10^{-5}$ in/in/deg F., and a backing layer bonded to the outer layer, the backing layer defined by a foam material. The outer layer and the backing later define a body having a substantially planar outer surface.

16 Claims, 19 Drawing Sheets

(56) References Cited

U.S. PATENT DOCUMENTS

| | | |
|---|---|---|
| 7,908,814 B2 | 3/2011 | Wilson et al. |
| 7,954,292 B2 | 6/2011 | Holt et al. |
| 8,061,097 B2 | 11/2011 | Holt et al. |
| 8,061,101 B2 | 11/2011 | Culpepper |
| 8,201,372 B2 | 6/2012 | Holt et al. |
| 8,225,573 B2 | 7/2012 | Wilson et al. |
| 8,381,472 B1 | 2/2013 | Fleenor |
| 8,387,325 B2 | 3/2013 | Mullet |
| 8,387,326 B2 | 3/2013 | Culpepper |
| 8,464,483 B2 | 6/2013 | Holt |
| 8,499,517 B2 | 8/2013 | Wilson et al. |
| 8,511,030 B2 | 8/2013 | Wilson et al. |
| 8,756,891 B2 | 6/2014 | Wilson et al. |
| 9,611,659 B2 | 4/2017 | Baert |
| 9,677,284 B1 | 6/2017 | Barrett |
| 10,253,506 B2 | 4/2019 | Culpepper et al. |
| 2007/0042193 A1 | 2/2007 | Wang |
| 2007/0212970 A1 | 9/2007 | Rockwell |
| 2009/0062413 A1* | 3/2009 | Adur .................. B29C 37/0032 521/157 |
| 2010/0028668 A1* | 2/2010 | Janda ........................ B32B 5/18 428/342 |
| 2010/0077689 A1 | 4/2010 | Kalkanoglu |
| 2010/0132289 A1 | 6/2010 | Mahaffey |
| 2011/0214372 A1 | 9/2011 | Mullet |
| 2012/0285109 A1 | 11/2012 | Mallinger |
| 2013/0122269 A1 | 5/2013 | Bourgeois |
| 2014/0170365 A1 | 6/2014 | Gavris |
| 2014/0227478 A1 | 8/2014 | Stucky |
| 2017/0234019 A1 | 8/2017 | Culpepper |

\* cited by examiner

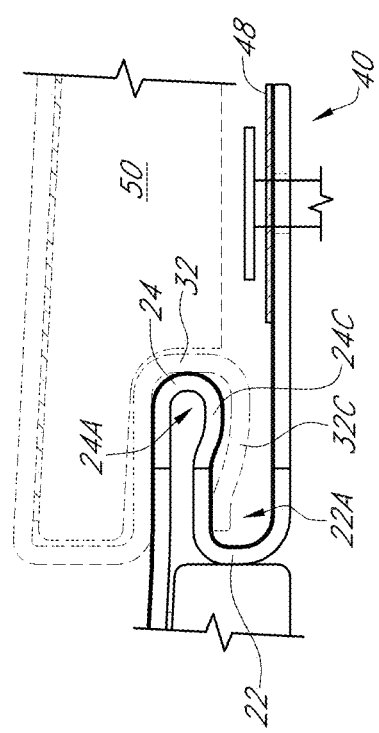

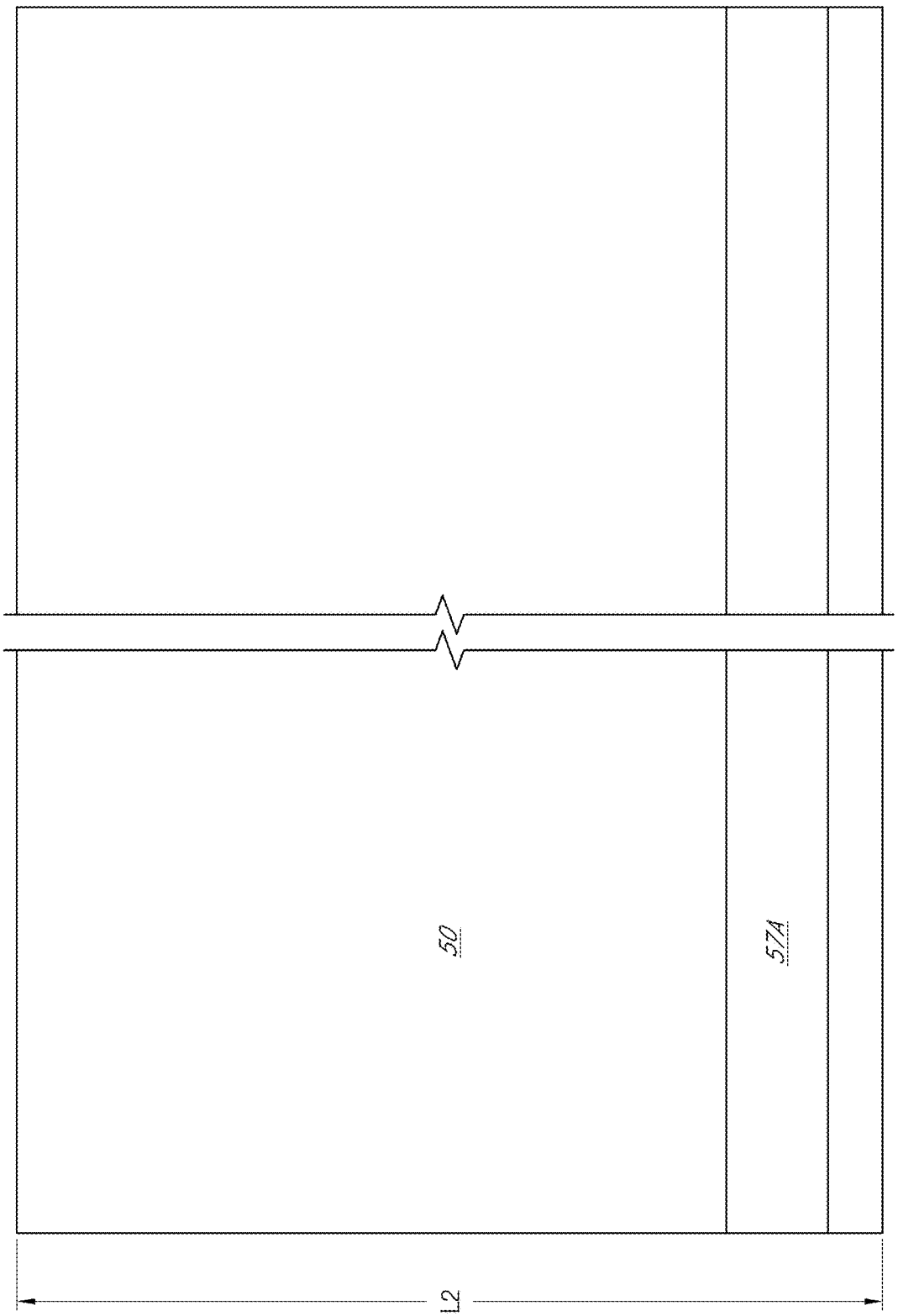

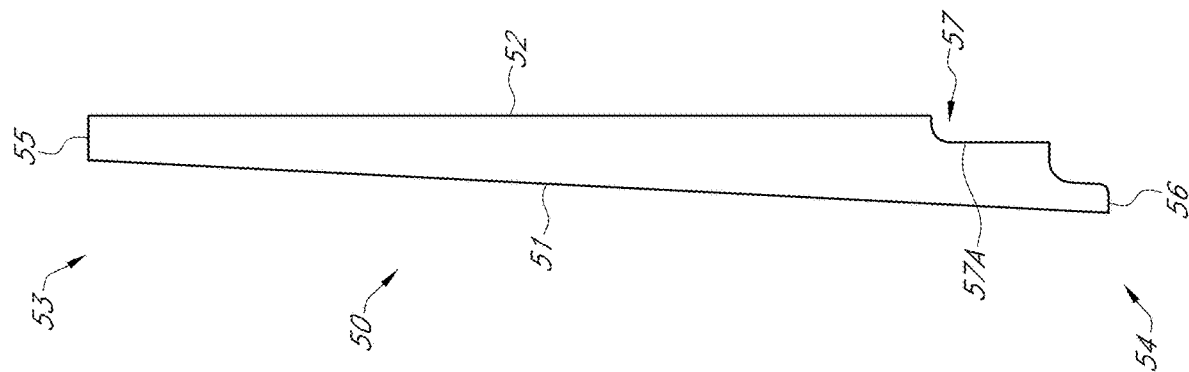

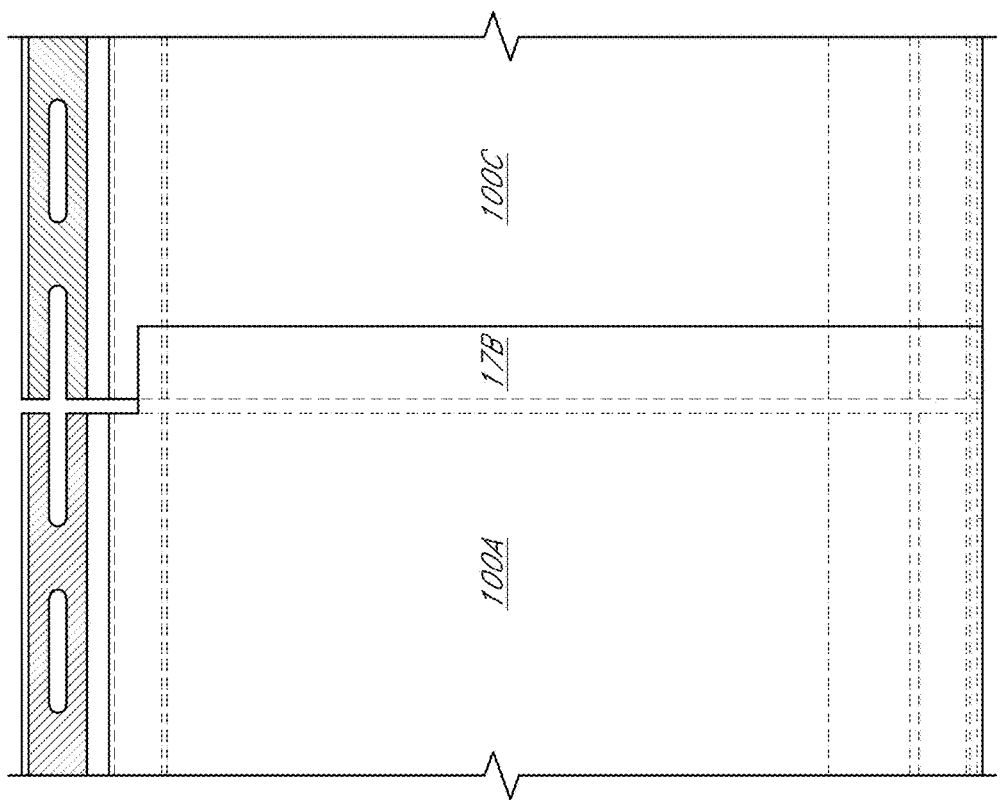
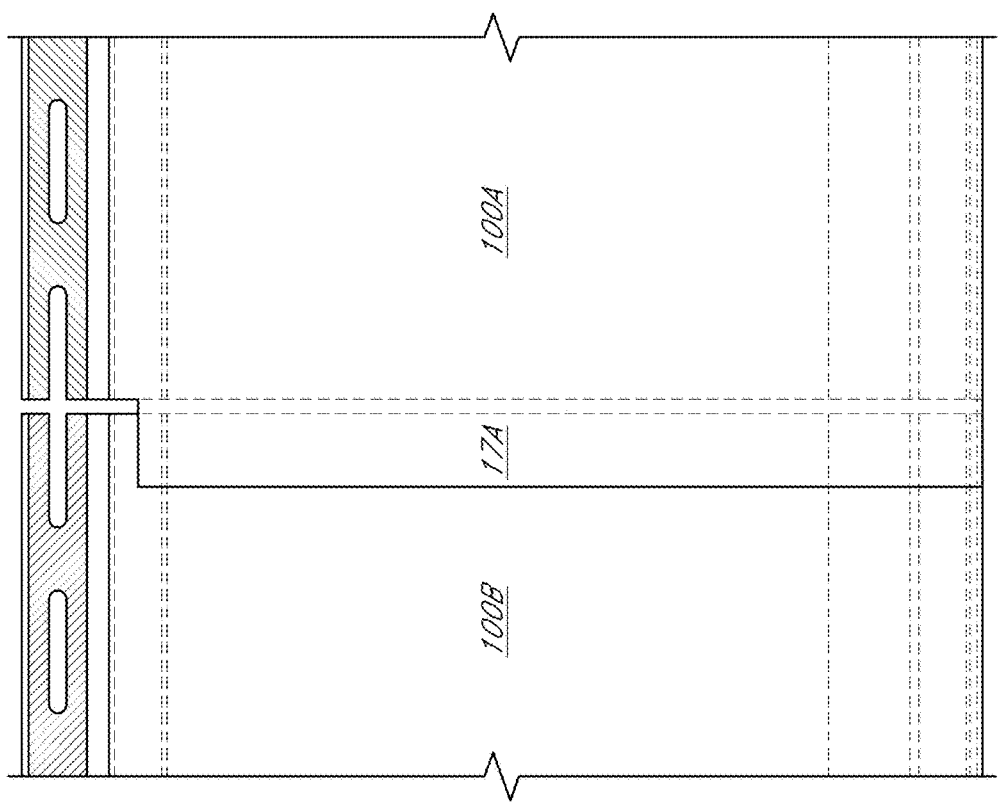
FIG. 5A

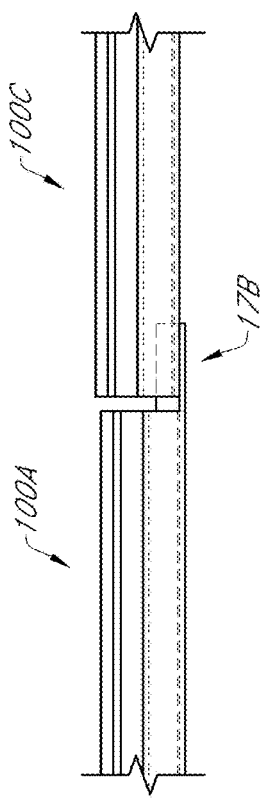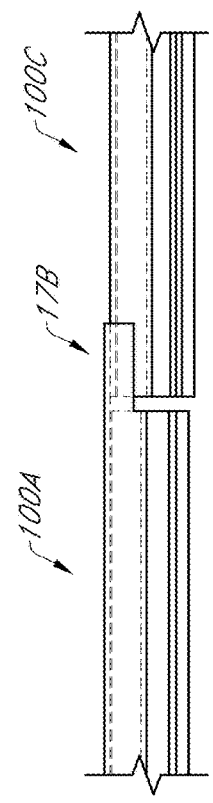
FIG. 5B
FIG. 5C
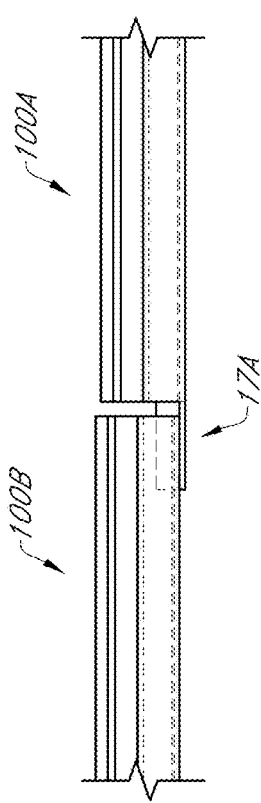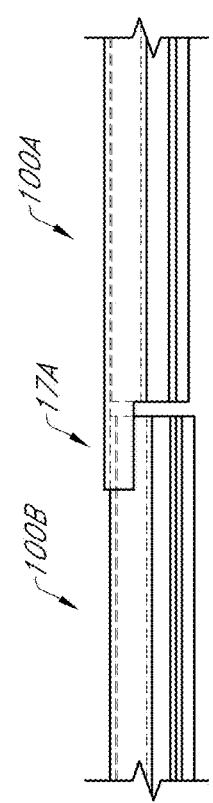

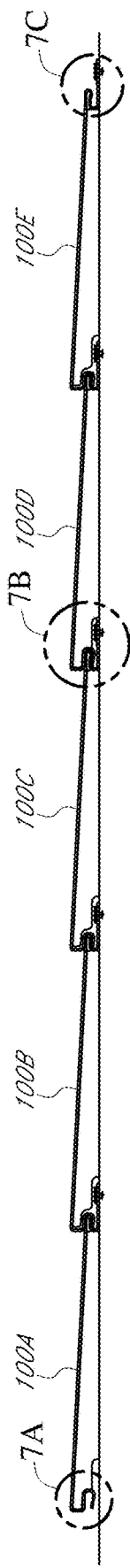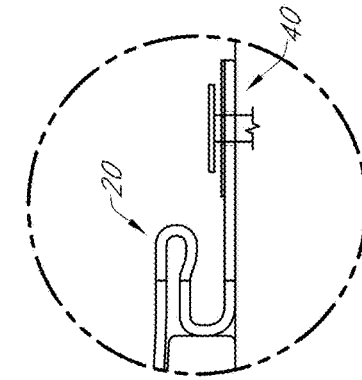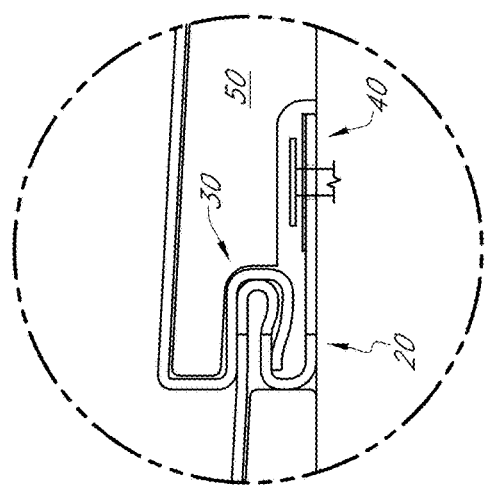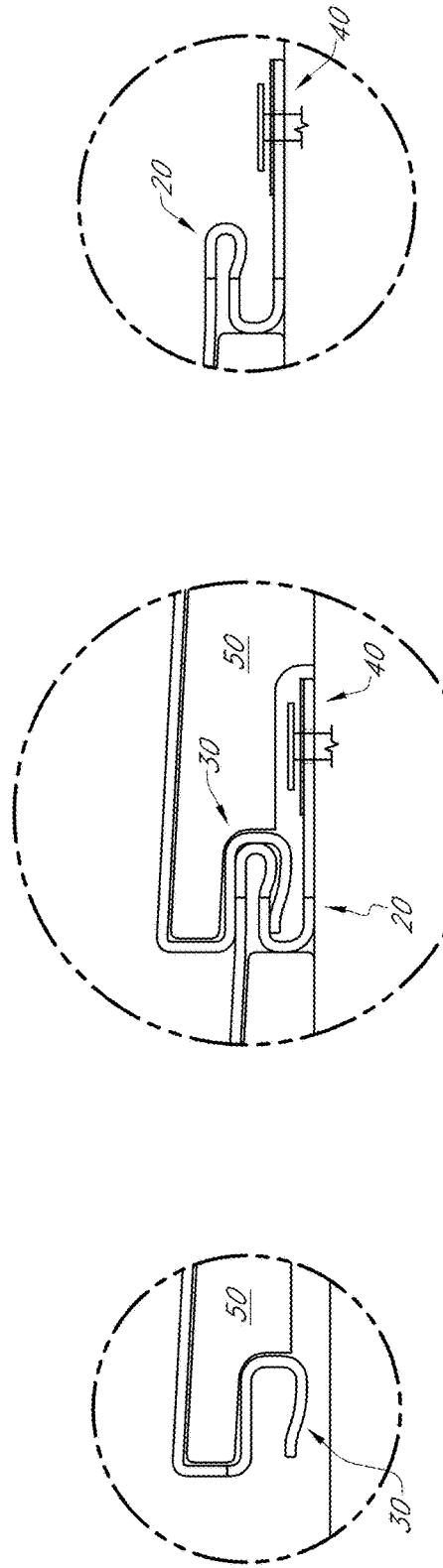
FIG. 7
FIG. 7A
FIG. 7B
FIG. 7C

SIDING PANEL ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of U.S. Provisional Patent Application No. 62/784,141 filed Dec. 21, 2018.

BACKGROUND

Field

Aspects of the present disclosure are directed to a thermoplastic composite sheet for exterior cladding applications, and more particularly to a low-profile siding panel with improved properties including low thermal expansion, fire performance, impact resistance, and workability.

Description of the Related Art

Siding, or wall siding, is commonly used to cover the exterior surfaces, e.g. walls, of structures. Such siding is often formed of metal, such as aluminum, or thermoplastic materials, such as polyvinyl chloride (PVC). Siding installed on vertical surfaces may be formed with one or more sections or courses. Such siding is typically installed in multiple rows of panels, with each row overlapping the panels to which it is adjacent. Adjoining panels are overlapped in this manner to provide protection for the structure from the weather.

Existing siding panels are limited in the length of the face or course of the panel. Additionally, siding panels made of thermoplastic materials (such as PVC) typically have a curved (e.g., non-planar) face.

SUMMARY

Accordingly, there is a need for improved materials and improved siding panel designs.

In accordance with one aspect of the disclosure, a siding panel is provided with improved resistance to thermal expansion. In one implementation, siding panels disclosed herein have a coefficient of linear thermal expansion (CLTE) lower than that of conventional vinyl siding. In one implementation, the siding panels disclosed herein have a CLTE approximately ⅓ lower than that of conventional vinyl siding.

In accordance with another aspect of the disclosure, a siding panel is provided with improved fire resistance characteristics. In some implementations, siding panels disclosed herein meet Class A fire code requirements.

In accordance with another aspect of the disclosure, a siding panel is provided with improved wind load resistance characteristics. In some implementations, siding panels disclosed herein can have a wind load rating suitable for use in zones or locations having nominal design wind speed up to about 180 miles/hour.

In accordance with another aspect of the disclosure, a siding panel is provided with a flat exterior wall for improved appearance.

In accordance with another aspect of the disclosure, a siding panel is provided with an improved lap design that results in improved planar (e.g., flat) appearance.

In accordance with another aspect of the disclosure, a siding panel is provided with improved workability characteristics. The siding panel can have a thickness of less than about 0.75 inches, allowing use of standard pocket accessories, such as for inside and outside corner posts or J-channel accessory, thereby facilitation installation of the panel.

In accordance with another aspect of the disclosure, a siding panel is provided with improved impact resistance characteristics. The siding panel can have Mean Failure Energy of greater than 35 in-lbf.

In accordance with another aspect of the disclosure, a siding panel is provided with improved temperature resistance characteristics. In some implementations, siding panels disclosed herein can withstand temperatures of up to approximately 180 degrees F. without warping, melting or oil-canning of the panel surface.

In accordance with one aspect of the disclosure, a thermoplastic composite sheet for exterior cladding applications is provided. The composite sheet comprises an outer layer comprising a thermoplastic resin composition reinforced with a high aspect ratio filler such that the outer layer has a coefficient of linear thermal expansion of no more than approximately $2.33 \times 10^{-5}$ in/in/deg F. The composite sheet also comprises a backing layer bonded to the outer layer, the backing layer defined by a foam material. The outer layer and the backing layer define a body having a substantially planar outer surface.

In accordance with another aspect of the disclosure, a thermoplastic composite sheet for exterior cladding applications is provided. The composite sheet comprises an outer layer comprising a Poly(vinyl chloride) thermoplastic resin reinforced with a high aspect ratio filler such that the outer layer has a coefficient of linear thermal expansion of no more than approximately $2.33 \times 10^{-5}$ in/in/deg F. The composite sheet also comprises a backing layer attached to the outer layer, the backing layer defined by a foam material.

BRIEF DESCRIPTION OF THE DRAWINGS

FIGS. 2A-2B show a schematic side view and partial side view of the siding panel of FIG. 1.

FIG. 3 is a schematic front view of a backing panel.

FIG. 4 is a side view of the backing panel in FIG. 3.

FIG. 5A is a schematic front view of a pair of siding panels aligned in a row.

FIG. 5B is a schematic top view of the pair of siding panels of FIG. 5A.

FIG. 5C is a schematic bottom view of a pair of siding panels of FIG. 5A.

FIG. 7 is a schematic side view of a siding assembly with a plurality of interlocked siding panels on a wall surface.

FIG. 7A is a schematic enlarged partial view of a proximal end of the siding assembly of FIG. 7.

FIG. 7B is a schematic enlarged partial view of an intermediate portion of the siding assembly of FIG. 7.

FIG. 7C is a schematic enlarged partial view of a distal end of the siding assembly of FIG. 7.

DETAILED DESCRIPTION

Siding Panel

Figure 1:
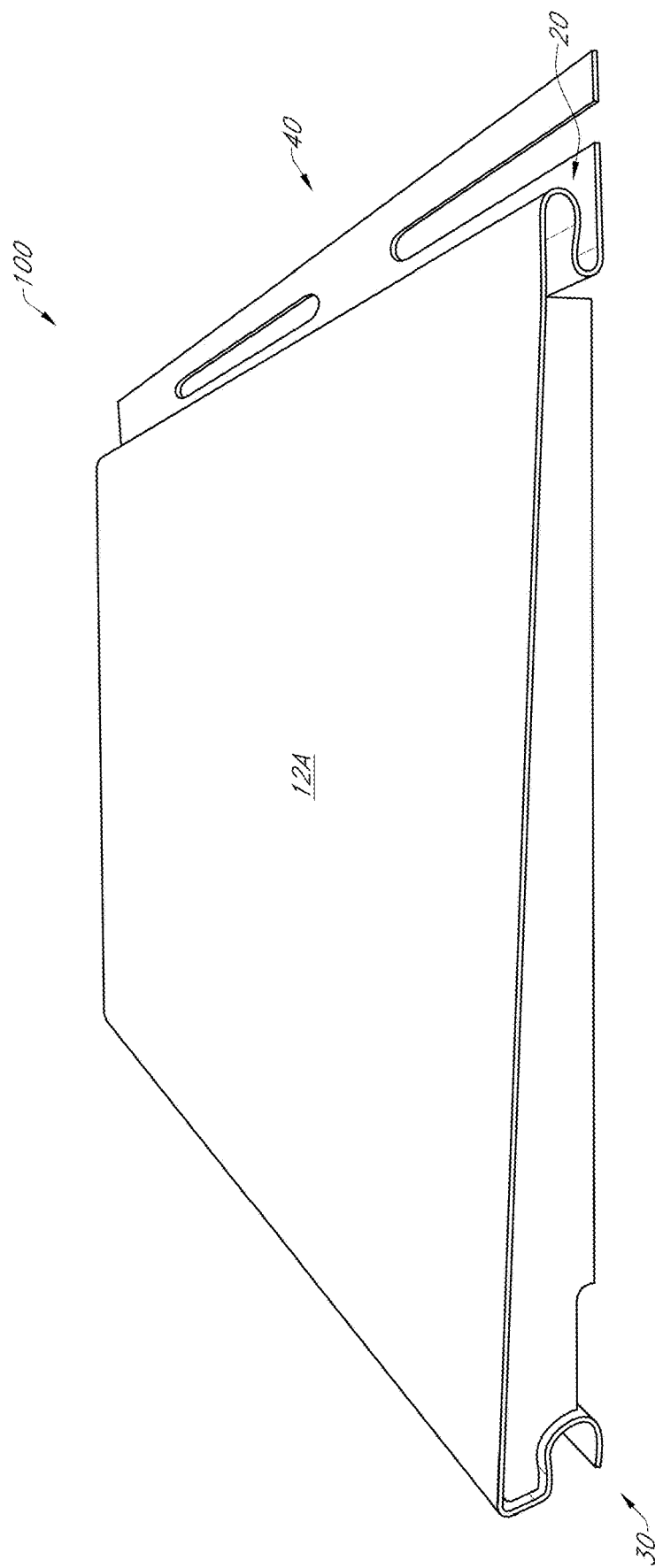
FIGS. 1-1C show schematic perspective, partial front, partial bottom and side view of a siding panel.
Figure 1A:
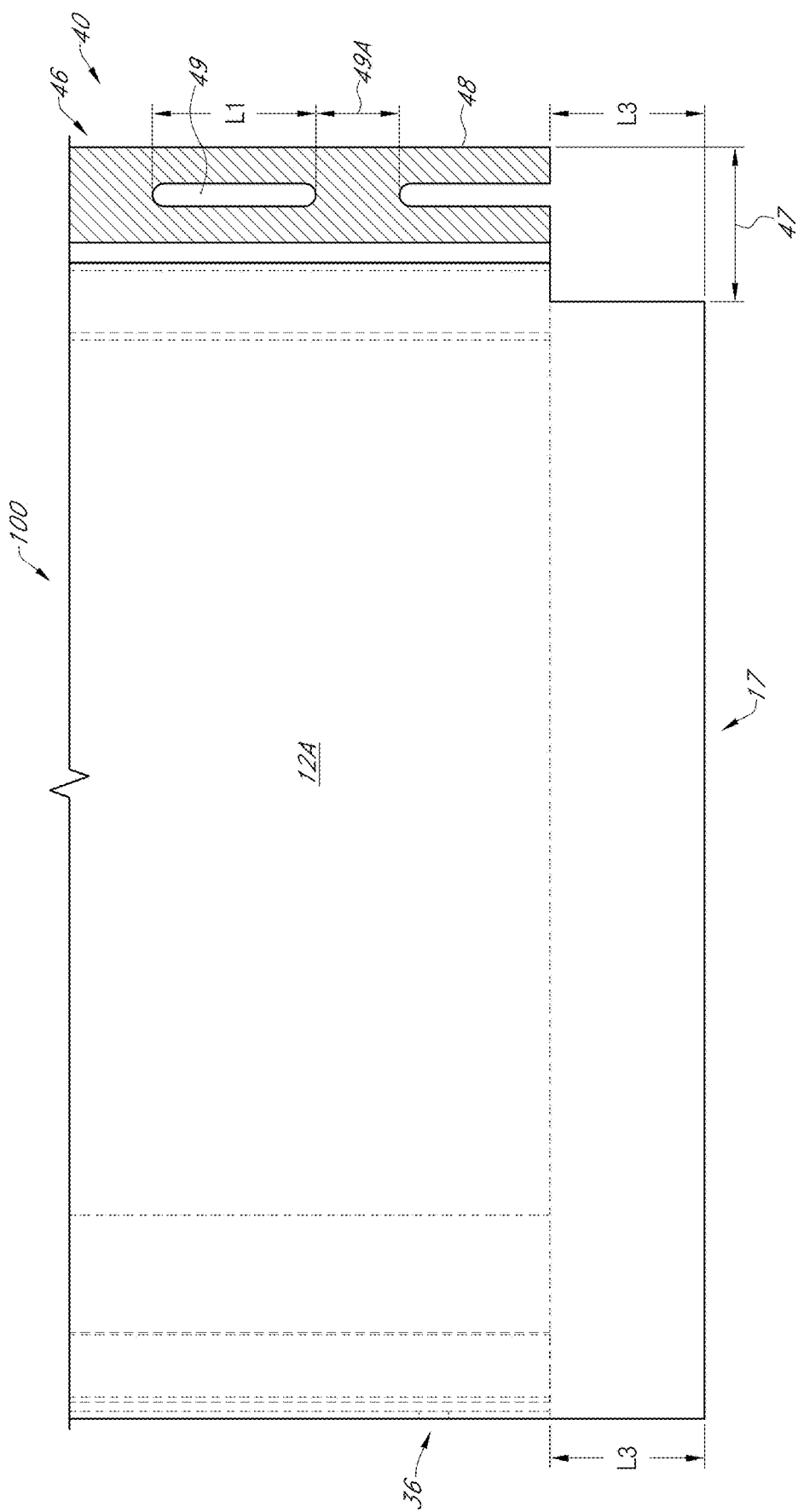
Figure 1B:
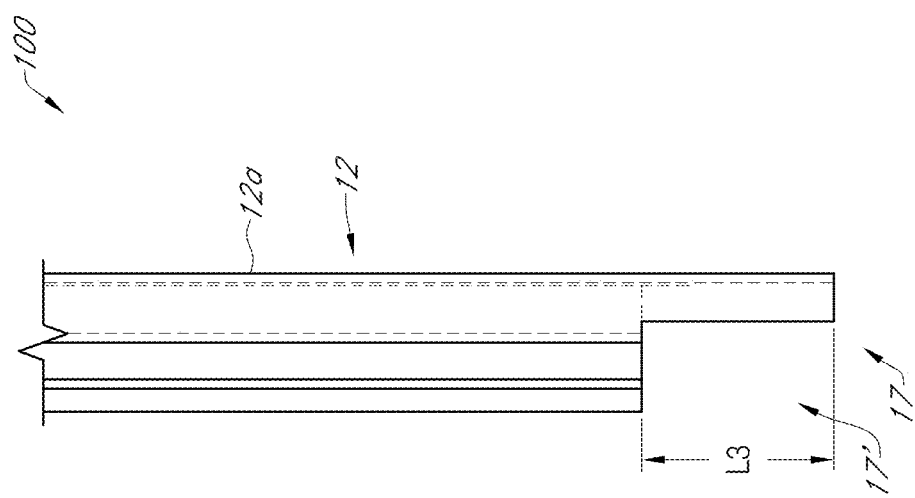
Figure 1C:
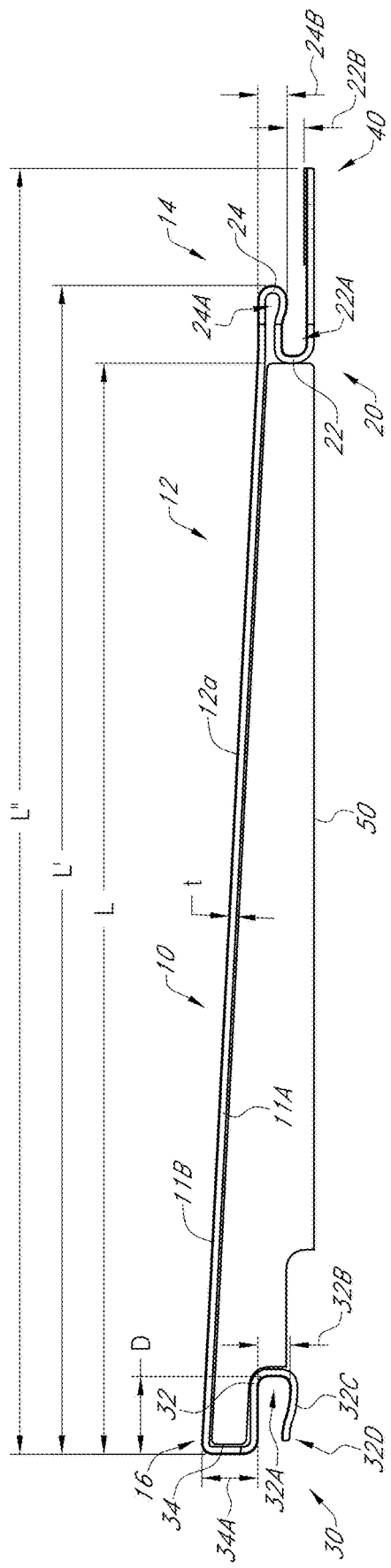
Figure 2A:
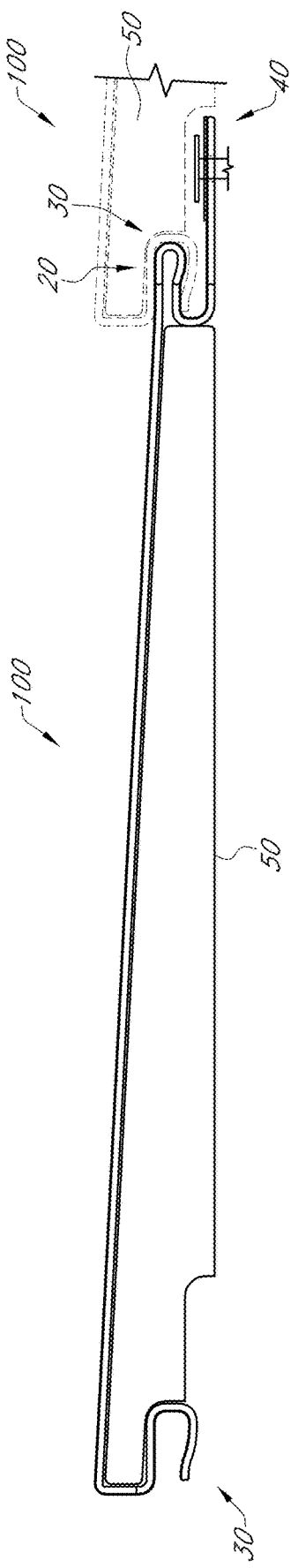

FIGS. 1-7 show a siding panel assembly 100 having a siding panel 10 and a backing panel 50. Optionally, the siding panel 10 can be defined by a single continuous sheet of material (e.g., monolithic, single piece, without seams). Optionally, the siding panel 10 can be made of a thermoplastic material. In one implementation, the siding panel 10 can be made of a composite material that includes the thermoplastic material. Optionally, the siding panel 10 can be made of a material that includes a polyvinyl chloride (PVC) resin. The composition of the siding panel 10 is further discussed below.

The siding panel 10 can include a course or face portion 12 with a forward facing (e.g., outer facing) surface 12a and a rearward facing (e.g., inner facing) surface 12b that extends from an upper end 14 to a lower end 16. Advantageously, the course or face portion 12 is substantially planar (e.g., along its entire span between the upper end 14 to the lower end 16). In one implementation, the course or face portion 12 is flat and presents a flat forward-facing surface 12a, advantageously providing an improved appearance (e.g., approximating that of wood or fiber cement siding).

Advantageously, the siding panel assembly 100 has a low profile. In one implementation, the siding panel assembly 100 has a maximum thickness H from a rear surface 52 of the backing panel 50 to the front facing surface 12a of the siding panel 10 of no more than approximately 0.7 inches, such as 0.72 inches. In one implementation, said maximum thickness is between about ½ inches and about ¾ inches. That is, the siding panel assembly 100 projects from the mounting surface (e.g., from the backerboard) no more than approximately between ½ inches and ¾ inches, such as approximately 0.7 inches, which facilitates the installation of the siding panel assembly 100, as further described below.

Optionally, one or both ends of the siding panel 10 can have an overhang portions 17 (that define end notches 17') that extends past the edge of the backing panel 50 and past the nail hem 40. As discussed further below, in one implementation, the overhang portions 17 of adjacent siding panels 10 can overlap. In another implementation, only one end of the siding panel 10 has the overhang portion 17 (or notch 17'), and during installation, the overhang portion 17 of one panel 10 extends over a straight cut end of an adjacent panel 10. In another implementation, the siding panel 10 does not have such overhang portions 17 (i.e., the siding panel 10 has a straight cut at the left and right end of the panel where the edge of the siding panel 10 generally aligns with the edge of the backing panel 50 and the edge of the nail hem 40).

In some implementations, the overhang portion 17 (and notch 17') has a width L3 of between approximately ½ inches to 1½ inches, such as between approximately ½ inches to 1¼ inches. In some implementations, the overhang portion 17 (or notch 17') has a width L3 of approximately 0.75 inches (e.g., the edge of the backing panel 50 is set back about 0.75 inches from the edge of the panel 10), which advantageously reduces the amount of the panel 10 that is not supported by the backing panel 50, resulting in advantages during installation and use, as further described below.

For example, reducing the width L3 of the overhang portion 17 to approximately 0.75 inches advantageously aids the siding panel assembly 100 in maintaining the planar (e.g., flat) appearance when overlapped with adjacent siding panel assemblies 100. As discussed further below, the reduction in the width L3 of the overhang portion 17 (and notch 17') is facilitated at least in part by the thermal expansion performance of the siding panel assembly 100. An upper or proximal edge of the overhang portion 17 can be spaced from the proximal edge 46 of the nail hem 40 by a distance 47. In some implementations, the distance 47 can be between about 0.5 inches and about 1.5 inches, such as about 1.0 inches. During installation of the siding panel assembly 100 adjacent a second siding panel assembly 100, the backing panel of the second siding panel assembly extends into the space or notch 17' under the overhang portion 17, and the overhang portion 17 of the siding panel assembly 100 overlaps with the siding panel 10 of the second siding panel assembly 100.

The siding panel 10 can have a thickness t of between about 0.040 inches and about 0.050 inches, such as approximately 0.048 inches. Optionally, the siding panel 10 can have a substantially uniform thickness (e.g., a constant thickness) along its entire span between the upper end 14 and the lower end 16). In other implementations, the thickness t of the siding panel 10 can be lower toward the edges of the panel 10.

The siding panel 10 can include one or more substrate layers 11A and one or more capstock layers 11B (e.g., weatherable layers). In one implementation, the one or more capstock layers 11B can have a thickness t2 of between about 0.004 inches and about 0.006 inches. In one implementation, the one or more substrate layers 11A can have a thickness t1 equal to the difference between the thickness t of the siding panel 10 and the thickness t2 of the capstock layers 11B, such as of about 0.034 inches and about 0.044 inches. Discussion of the materials of the siding panel 10 is provided further below.

In one implementation, the course or face portion 12 can have a length L between the upper and lower ends 14, 16 of approximately seven inches. In another implementation, the course or face portion 12 can have a length L between the upper and lower ends 14, 16 of approximately five inches. In still another implementation, the course or face portion 12 can have a length L between the upper and lower ends 14, 16 of between about four inches and about twelve inches, such as about five inches or six inches. However, the face portion 12 of the panel 10 can have other suitable lengths L that are greater or smaller than those provided above. The siding panel 10 can have a length L' between the upper and lower ends 14, 16 that is greater than the length L of the course portion 12. The length L' can be between about five inches and about 14 inches, such as about 7.5 inches. However, the siding panel 10 can have other suitable lengths L' that are greater or smaller than those provided above. The siding panel 10 can have a length L" between a proximal edge 46 of a nail hem 40 and the lower end 16 that is greater than the length L'. The length L" can be between about six inches and about 15 inches, such as about 8.25 inches. However, the siding panel 10 can have other suitable lengths L" that are greater or smaller than those provided above.

The siding panel 10 can have a lock portion 20 attached or connected to the upper end 14 of the course portion 12 and a buttlock portion 30 attached or connected to the lower end 16 of the course portion 12.

The lock portion 20 can include a U-shaped wall portion 22 that defines an upward facing channel 22a having a width 22b. The U-shaped wall portion 22 can be connected to the course portion 12 by a U-shaped wall portion or tongue portion 24 that defines a downwardly facing channel 24a having a width 24b. Optionally, the width 22b is greater than the width 24b. The U-shaped wall portion or tongue portion 24 can have a bulbous portion 24C (e.g., that curves outward relative to a straight plane), that facilitates locking the tongue portion 24 in a buttlock portion 30 of an adjacent siding panel assembly 100.

The buttlock portion 30 can include a U-shaped wall portion 32 that defines a downward facing channel 32a having a width 32b. Optionally, the width 32b is greater than the width 24b, such that the downward facing channel 32a of the buttlock portion 30 of one siding panel 10 fits over and receives the U-shaped wall portion 24 of an adjacent siding panel 10. Optionally, a wall segment 32c of the U-shaped wall portion 32 extends at an angle 32d such that the wall segment 32c is not parallel to the opposite wall segment of the U-shaped wall portion 32 so that the downward facing channel 32a tapers toward its open end. The angle 32d can be between about 3 degrees and about 10 degrees, such as about 5 degrees. Advantageously, such a tapered channel 32a can resiliently fit over the U-shaped wall portion or tongue portion 24 to more securely (e.g., rigidly) couple one siding panel 10 to another siding panel 10, and avoid slop (e.g., play) between the tapered channel 32a and the U-shaped wall portion 24 to thereby avoid rattling of one panel 100 relative to an adjacent panel 100 below it (e.g., when the panels 100 are exposed to wind once installed). The tapered channel 32a also allows the wall segment 32c to clear the nail head of the nail on the nail hem 40 of an adjacent panel 100.

The U-shaped wall portion 32 can be connected to the lower end 16 of the course portion 12 by a base portion 34 having a width 34a. The U-shaped wall portion or lock 32 can have a depth D of between about 0.40 inches and about 0.50 inches (e.g., 0.50 inches) that receives the U-shaped wall portion or tongue portion 24 of an adjacent panel assembly 100. Optionally, the width 34a is greater than the width 24b. Optionally, the width 22b is greater than the width 24b. One or more weep slots 36 can be formed in the base portion 34. Advantageously, the coupling of the tongue portion 24 and buttlock portion 30 (e.g., the bulbous portion 24C of the tongue portion 24 with the lock 32) provides a resilient connection between adjacent panel assemblies 100 that resulted in improved windload performance, which is discussed further below. Additionally, the coupling between the tongue portion 24 and the lock portion 32 of adjacent siding panel assemblies 100 can inhibit flame spread between adjacent panel assemblies, resulting in improved fire performance for the panel assembly 100.

The siding panel 10 can also include a nail hem 40. The nail hem 40 can include a substantially planar wall (e.g., a flat wall) 42 that extends from (e.g., is integrated with) the U-shaped wall portion 22 that defines the upwardly facing channel 22a to a proximal edge 46 (e.g., nail hem 40 defined by a single wall 42). As shown in FIG. 1, the nail hem 40 is spaced behind the course portion 12 and extends above the upper end 14 of the course portion 12 (e.g., the proximal edge 46 extends past the upper end 14 of the course portion 12). Advantageously, the nail hem 12 is defined by a single wall that extends to the proximal edge 46, providing a lower profile nail hem. Optionally, the nail hem 40 can include a reinforcement strip 48 along at least a portion of the span of the nail hem 40. For example, in one implementation, the reinforcement strip 48 can extend along some but not all of the span of the nail hem 40. In one implementation, the reinforcement strip 48 is made of a thermoplastic material (e.g., PVC). In one implementation, the reinforcement strip 48 is embedded in the nail hem 40. In another implementation, the reinforcement strip 48 is attached to an outer surface of the substantially planar wall 42 of the nail hem 40. Optionally, the reinforcement strip 48 can be extruded and laminated onto the planar wall 42 of the nail hem 40. In another implementation, the reinforcement strip 48 can be adhered to (e.g., with an adhesive) the planar wall 42 of the nail hem 40. In another implementation, the reinforcement strip 48 can be laminated and taped over the planar wall 42 of the nail hem 40. In one implementation, the reinforcement strip 48 is approximately 0.015 inches thick.

Advantageously, the reinforcement strip 48 allows the reinforcement of the nail hem 40 while maintaining a low profile for the nail hem 40, as further discussed below. For example, the nail hem 40 does not have a rollover portion (as conventional siding elements do), which allows the nail hem 40 to have a lower profile. Having such a low profile for the nail hem 40 allows the backing panel 50 to have additional volume (because the backing panel 50 does not have to be cut to accommodate a rollover portion of the nail hem of an adjacent siding panel assembly 100), resulting in a siding panel assembly 100 with a higher R value and improved noise insulation (e.g., noise deadening) properties. The lower profile also facilitates installation of the siding panel assemblies 100, as further discussed below, by facilitating the coupling of the U-shaped wall portion 32 of the buttlock portion 30 of one siding panel assembly 100 over the u-shaped wall portion 24 of the lock portion 20 in an adjacent siding panel assembly 100 in a tongue-in-groove manner, and by allowing the use of standard accessories (e.g., J-channel or inside and outside corner posts, etc.).

The nail hem 40 can have one or more openings (e.g., one or more slot openings) 49 therein, through which at least a portion of one or more nails can be inserted. Optionally, the openings 49 are defined through the reinforcement strip 48 and the substantially planar wall 42. Optionally, the one or more openings 49 can be formed using a rotary punch tool. However, the one or more openings 49 can be formed in other suitable manners. In one implementation, the one or more openings 49 can have a length L1 of between about 1 inch and about 1.12 inches, and the spacing 49A between the openings 49 can be between about 0.48 inches and about 0.6 inches. Advantageously, the length L1 of the one or more openings 49 and/or spacing 49A between the openings 49 aids in improving the windload resistance of the siding panel assembly 100, as discussed further below. For example, the length L1 of the one or more openings and/or the spacing 49A between the openings 49 allow the siding panel assembly 100 to be more securely installed (e.g., by increasing the number of openings 49 on the nail hem 40 that can receive nails during installation). As discussed further below, the increase in the number of openings 49 and/or reduction in the spacing 49A between openings 49 is facilitated at least in part by the thermal expansion performance of the siding panel assembly 100.

Backing Panel

With continuing reference to FIGS. 1-7, the backing panel 50 can have a front surface 51 that extends from an upper end 53 to a lower end 54, a shoulder or ledge 55 at the upper end 53 and a rib 56 at the lower end 54. The backing panel 50 can optionally have a recessed portion 57 defined by surface 57a that is recessed relative to the rear surface 52 and proximate the lower end 54. The backing panel 50 can extend along a length L2 of between about 5 inches and about 8 inches, in one example about 7 inches. However, the backing panel 50 can have other lengths L2 that are greater or smaller than those provided above. The rear surface 52 of the backing panel 50 substantially aligns with the substantially planar wall 42 of the nail hem 40 (e.g., so that the rear surface 52 and nail hem 40 substantially extend along the same plane or are coplanar). The backing panel 50 tapers toward the upper end 53. Advantageously, the lower end 54 of the backing panel 50 extends to the lower end 16 of the siding panel 10 (e.g., between the channel 32a and the rear facing surface of the siding panel 10). This advantageously inhibits (e.g., prevents) the sinking of the panel 10 at the lower end 16 (e.g., distal location of the siding panel 10 that is disposed over the nail hem of an adjacent siding panel assembly 100), for example when exposed to high temperatures (e.g., between 150 degrees F. and 210 degrees F.). Accordingly, the siding panel assembly 100 provides support of the siding panel 10 by the backing panel 50 along the length L of the course or face portion 12 of the siding panel 10.

Optionally, the backing panel 50 can be made of a closed cell or open cell material. In one implementation, the backing panel 50 can be made of a light-weight foam material. For example, in some implementations, the backing panel 50 can be made of a PVC foam material. In another implementation, the backing panel 50 can be made of an expanded polystyrene (EPS) closed cell rigid foam insulation material (e.g., having a 1.0 lb/ft$^3$ density, having a 2.0 lb/ft$^3$ density, etc.). In another example, the backing panel 50 can be made of a graphite polystyrene (GPS) foam, such as NEOPOR® by BASF, which advantageously has higher fire resistance (e.g., GPS 2300 1.0 lb/ft$^3$ density, GPS 2300 1.25 lb/ft$^3$ density, GPS 2300 1.5 lb/ft$^3$ density). In other implementations, the backing panel 50 can be made of GPS foam such as NEOPOR® by BASF with extra graphite (e.g., GPS 5200+ 0.85 lb/ft$^3$ density, 5200+ 1.0 lb/ft$^3$ density, GPS 5300+ 0.85 lb/ft$^3$ density, GPS 5300+ 1.0 lb/ft$^3$ density, GPS 5300+ 1.25 lb/ft$^3$ density). In still another example, the backing panel 50 can be made of extruded polystyrene (XPS) closed cell rigid foam insulation material, which advantageously provides improved rigidity. In still another example, the backing panel 50 can be made of polyurethane foam (e.g., 2.0 lb/ft$^3$ density foam made by Jasper Plastics). In still other implementations, the backing panel 50 can be made of a foam with a density of between approximately 0.75 lb/ft$^3$ and approximately 2.10 lb/ft$^3$. In still another implementation, the backing panel 50 can be made of polypropylene. In another implementation, the backing panel 50 can be a foil backing (e.g., aluminum on either side of a paper core), which has an improved fire rating performance. Advantageously, the backing panel 50 can be rigid or substantially rigid and provides rigidity to the siding panel assembly 100 (e.g., when a user presses against the siding panel assembly 100 once installed on a wall). The backing panel 50 can have an R value of 1.5 to 2.0, and facilitate the sound deadening qualities of the siding panel assembly 100.

Adhesive

The backing panel 50 can be attached to the siding panel 10. For example, the front surface 51 of the backing panel can be adhered (e.g., with an adhesive) to the rear facing surface 12b of the course portion 12, so that the shoulder or ledge 55 is adjacent (e.g., below) the U-shaped wall portion 22 of the lock portion 20 and so that the rib 56 is disposed between the rear facing surface 12b and the U-shaped wall portion 32 of the buttlock portion 30 to facilitate retaining of the backing panel 50 within the envelope of the siding panel 10. In one implementation, the backing panel 50 is adhered to the rear facing surface 12b of the course portion 12 with a high temperature adhesive, such as a crosslinked polyurethane (PUR) adhesive. In another implementation, the adhesive can be a pressure sensitive adhesive (PSA). Optionally, the adhesive can have a thickness of between about 0.010 and 0.020 inches. Advantageously, adhering the backing panel 50 to the siding panel 10 aids in maintaining the siding panel 10 in a substantially flat or planar shape, as well as in reducing the coefficient of linear thermal expansion (CLTE) of the siding panel assembly 100. In one implementation, the adhesive advantageously maintains adhesion between the siding panel 10 and the backing panel 50 up to temperatures of approximately 180 deg. F. to 210 deg. F. (e.g., under outdoor exposure to sunlight or sunlight reflected onto panel assembly 100 from nearby windows).

Composition

As discussed above, the siding panel 10 can have one or more capstock layers 11B and one or more substrate layers 11A. The capstock layer(s) 11B can be disposed over (e.g., cover the substrate layers 11A (e.g., such that the substrate layer(s) 11B are disposed between the capstock layer(s) 11B and the backing panel 50. Optionally, the one or more capstock layers 11B can be co-extruded over the one or more substrate layers 11A.

In one implementation, the one or more capstock layers 11B can be made of PVC. In another implementation, the one or more capstock layers 11B can be made of acrylonitrile-styrene-acrylate (ASA) material. In still other implementations, the capstock layer(s) 11B can be made of other suitable materials.

The one or more substrate layers 11A can be made of a reinforced thermoplastic material. In one implementation, the thermoplastic material can be vinyl (e.g., Poly(vinyl chloride)). In other implementations, the thermoplastic material can be another polymer material (e.g., polypropylene, polyethylene, etc.). In one implementation, the thermoplastic material can be reinforced with high aspect ratio fillers. In one implementation, the high aspect ratio fillers are randomly distributed in the thermoplastic material. In one implementation, the high aspect ratio fillers include glass fiber (e.g., reinforced glass fiber, fiberglass). In one implementation, the fiberglass has an aspect ratio of at least 10 to 1 at a loading of at least 5% (e.g., in an amount of at least 5% of the thermoplastic material composition). In one implementation, the thermoplastic material can additionally or alternatively be reinforced with Wollastonite (e.g., can be made of glass fiber reinforced with Wollastonite) as the high aspect ratio filler. In one implementation, the Wollastonite fillers have an aspect ratio of at least 5 to 1 at a loading of at least 10% (e.g., in an amount of at least 10% of the thermoplastic material composition). In still other implementations, the thermoplastic material can be reinforced with other materials (e.g., KEVLAR®, carbon fiber, talc, etc.). In another implementation, the high aspect ratio fillers include talc and has an aspect ratio of at least 5 to 1 at a loading of at least 10% (e.g., in an amount of at least 10% of the thermoplastic material composition).

The thermoplastic material of the substrate layer(s) 11A can include one or more additives (e.g., fire retardant chemicals) to enhance the fire resistance of a panel assembly, such as the siding panel assembly 100, made with the thermoplastic material. In one implementation, the fire retardant chemical can be Zinc Hydroxy Stannate (ZHS). In another implementation, the fire retardant chemical can be Zinc Borate. In still another implementation, the fire retardant chemical can be antimony. In still another implementation, the fire retardant chemical can be Ammonium OctaMolybdate. In still another implementation, the fire retardant chemical can be a Molybdate containing composition including Zinc Molybdate on Talc. However, other suitable fire or flame retardant materials can be used. In some implementations, the fire retardant chemical is provided in an amount of between about 0.5% and about 5% of the thermoplastic composition, such as the thermoplastic compositions (e.g., of the thermoplastic resin composition) disclosed herein.

The thermoplastic material of the substrate layer(s) 11A can include one or more additives (e.g., impact modifiers) to enhance the impact resistance of a panel assembly, such as the siding panel assembly 100, made with the thermoplastic material. In some implementations, the thermoplastic material composition (e.g., thermoplastic resin composition) includes an impact modifier in an amount of between about 5% and 15% of the composition. In one implementation, the impact modifier is Chlorinated Poly(ethylene) or CPE impact modifier. In some implementations, Chlorinated Poly(ethylene) impact modifier is used in an amount of approximately 12% of the composition. In another implementation, the impact modifier is a cross-linked Poly (butyl methacrylate) with a Poly(methyl methacrylate) shell (e.g., an acrylic impact modifier). In some implementations, the acrylic impact modifier (e.g., a cross-linked Poly (butyl methacrylate) with a Poly(methyl methacrylate) shell) is used in an amount of approximately 10% of the composition. In another implementation, the impact modifier is Butyl acrylate rubber core with a methyl methacrylate shell. In another implementation, the impact modifier is Methyl methacrylate Butadiene Styrene terpolymer. However, other suitable impact modifier materials can be used. Advantageously, the impact modifier can inhibit (e.g., prevent) crack propagation in the thermoplastic material (e.g., in rigid poly(vinyl chloride)).

In one implementation, the substrate layer(s) 11A can optionally include a composite mixture including between about 0% and 20% glass fiber, and between about 0% and about 80% Wollastonite, with the remainder of the substrate layer(s) 11A made up of other components, such as vinyl resin, impact modifiers (e.g., acrylic impact modifier (AIM) or Chlorinated Polyethylene (CPE) impact modifier), lubricants, stabilizers, etc. Provided below are two examples of a composition of the substrate layer(s) 11A of a siding panel, such as the siding panel 10, where PHR is parts per hundred resin.

In some implementations, the composition can include an impact modifier in an amount that is between about 5% and about 15% of the composition, as discussed above. In one implementation, the impact modifier can be Cross-linked Poly(butyl methacrylate), with a Poly(methyl methacrylate) shell (Acrylic). In another implementation, the impact modifier can be Chlorinated Poly(ethylene) (CPE). In some implementations, the composition can include a fire retardant chemical (such as the fire retardant chemicals discussed above) in an amount that is between about 0.5% and about 5% of the composition. In some implementations, the composition can include a stabilizer in an amount that is between about 1% and about 2% of the composition. In one implementation, the stabilizer can be Butyl Tin Thioglycolate. In some implementations, the composition can include a lubricant in an amount that is between about 2% and about 4% of the composition. In some implementations, the composition can include pigments in an amount between about 0% and about 5% of the composition.

Thermal Expansion

A panel assembly, such as the panel assembly 100, with the materials disclosed herein for the panel 10, such as the materials for the substrate layer(s) 11A and/or capstock layer(s) 11B disclosed herein, advantageously has improved resistance to thermal expansion as compared with standard vinyl siding material. Whereas standard vinyl siding material has a coefficient of linear thermal expansion (CLTE) of approximately $3.4 \times 10^{-5}$ (in/in/deg F.) or $3.5 \times 10^{-5}$ (in/in/deg F.), a siding panel having the materials disclosed herein, such as the materials for the substrate layer(s) 11A and/or capstock layer(s) 11B of the siding panel 10, advantageously has a CLTE approximately $\frac{1}{3}^{rd}$ lower than standard vinyl siding (e.g., approximately $2.33 \times 10^{-5}$ in/in/deg F.). Samples of the siding panel 10 were tested in accordance with ASTM D696-16 achieved an average CLTE of $2.04 \times 10^{-5}$ (in/in/deg F.) in the machine direction, with certain samples achieving an even lower average CLTE of $8.95 \times 10^{-6}$ (in/in/deg F.) in the machine direction. Two additional samples of the siding panel 10 with the Acrylic composition disclosed herein were tested in accordance with ASTM D696-16. One sample achieved an average CLTE of $2.22 \times 10^{-5}$ (in/in/deg F.), and the other sample achieved an average CLTE of $2.26 \times 10^{-5}$ (in/in/deg F.), resulting in an average CLTE measurement of $2.24 \times 10^{-5}$ (in/in/deg F.). The CLTE of the siding panel 10 can be reduced further when adhered (e.g., with one of the adhesives disclosed herein) to a backing panel (e.g., the backing panel 50 disclosed herein made of any of the backing panel materials disclosed herein). Accordingly, a panel assembly with the materials disclosed herein, such as the siding panel assembly 100 described above, advantageously has a CLTE of no more than approximately $2.33 \times 10^{-5}$ (in/in/deg F.) when exposed to a temperature of up to 180 degrees Fahrenheit.

One advantage provided by the improved thermal expansion characteristics is the ability to provide a planar (e.g., flat) panel profile. In contrast, prior existing vinyl siding panels are not able to provide a flat profile due to their much higher CLTE, (approximately ⅓ higher) as discussed above. Another advantage provided by the improved thermal expansion characteristics is the ability to reduce the width D of the overhang portion or notch 17 of the siding panel assembly 100, as discussed above, which increases the area of the siding panel 10 that is attached (e.g., adhered to) the backing panel 50, thereby aiding in maintaining the planar (e.g., flat) profile of the siding panel 10 during installation (e.g., because the overhang portion that can flex is smaller). Another advantage provided by the improved thermal expansion characteristics is the ability to reduce the spacing 49A between the openings or slots 49 in the nail hem 40, allowing additional openings or slots 49 for a given length to be provided in the nail hem 40. Further, the low thermal expansion advantageously allows the length of the openings or slots 49 to be shorter (e.g., approximately 1.06 inches as compared to 1.25 inches in conventional siding panels), resulting in the nail hem 40 having additional material and therefore greater strength. The greater number of openings or slots 49 in the nail hem 40 advantageously provides the siding panel 10 with improved wind load resistance, discussed further below. Another advantage provided by the improved thermal expansion characteristics is inhibiting (e.g., preventing) oil-canning of the siding panel 10 since it is subjected to less expansion and contraction during use.

Surface Distortion

Samples having the compositions described above for the substrate layer(s) 11A were tested in accordance with ASTM 3679 Section 5.8. The samples withstood temperatures of up to 180 deg F. without exhibiting surface distortions or oil-canning (e.g., bulges, waves, ripples, etc.).

Additionally, a high-altitude test was conducted of various siding panel samples having the materials disclosed herein, such as the materials for the substrate layer(s) 11A and/or capstock layer(s) 11B disclosed herein. Exposure testing was conducted over a month with the samples facing the sun in Prescott, Ariz. at tilt angles of 90 degrees from the horizontal facing south. Six samples of a siding panel, similar to the siding panel 100, were exposed to ambient temperatures up to 90 degrees F. and humidity levels of 10-37% over a period of one month. The siding panel samples included a siding panel 10 with the CPE formulation described above, a backing panel 50 of 0.85 $lbf/ft^3$ density of GPS 5200+ foam material, and PUR adhesive between the backing panel 50 and siding panel 10. The high altitude tests reported maximum temperature readings taken of the samples of up to 155 degrees F. None of the samples exhibited surface distortion or oil-canning (e.g., bulges, waves, ripples, etc.) after thirty days of exposure. Further, testing of samples of a siding panel, similar to the siding panel 100, were exposed temperatures up to 210 degrees F. in separate testing without exhibiting surface distortion or oil-canning (e.g., bulges, waves, ripples, etc.).

Fire Performance

Various different samples having the compositions described above for the substrate layer(s) 11A were tested for flame spread and smoke development. The results are shown in Table 1, below. Each test was conducted in accordance with Standard ANSI/UL723, Tenth Edition, dated Sep. 10, 2008 with revisions through Aug. 12, 2013, "Test for Surface Burning Characteristics of Building Materials", (ASTM E84). Based on the National Fire Protection Association Life Safety Code, NFPA No. 101, a Class I (or A) material has a flame spread of 0-25 and smoke developed of 0-450, a Class II (or B) material has a flame spread of 26-75 and smoke developed of 0-450, and a Class III (or C) material has a flame spread of 76-200 and smoke developed of 0-450. As shown in the results below, all samples tested met the Class A fire rating. In some implementations, the fire retardant chemical promotes carbonaceous char on burning so that it does not exhibit char afterglow, which advantageously decreases heat released, oxygen consumption, production of carbon oxides and possible fire spread.

TABLE 1

Flame Spread and Smoke Development Test Results.

| Fire Retardant Chemical - Impact Modifier | Backing Material | Calculated Flame spread (CFS) | Flame Spread Index (FSI) | Calculated Smoked Development (CSD) | Smoke Development Index (SDI) |
|---|---|---|---|---|---|
| ZHS - CPE | 1 $lb/ft^3$ EPS | 13.6 | 15 | 428.0 | 450 |
| ZHS - Acrylic | 1 $lb/ft^3$ GPS | 14.5 | 15 | 444.4 | 450 |
| ZHS - Acrylic | 1.5 $lb/ft^3$ GPS | 12.1 | 10 | 429.2 | 450 |
| ZHS - Acrylic | 1.25 $lb/ft^3$ GPS | 23.3 | 25 | 469.3 | 450 |

Wind Load Testing

Samples of the panel assembly 100 with the composition of the one or more substrate layers 11A described above were also subjected to windload testing to test their windload resistance. Each test was conducted in accordance with ASTM D5206-13. All loads were negative pressure and held for thirty seconds. A 5 $lbf/ft^2$ pre-load was applied before testing the samples to failure. The temperature during testing was 18 Celsius. The results of such testing are provided in Table 2 below. As shown in the test results below, all samples of the panel assembly 100 did not exhibit damage under pressures of at least up to 55 $lbf/ft^2$ pre-load, making them suitable for use in in zones or locations having a nominal design wind speed of up to 180 miles/hour (mph) for category 2 buildings.

TABLE 2

Windload Test Results.

| Test No. | Capstock Material | Impact Modifier | Backing Material | Pressure applied without failure ($lbf/ft^2$) | Average Ultimate Negative Test Pressure ($lbf/ft^2$) | Max. Nominal Design Wind Speed for which panel is suitable for (mph) |
|---|---|---|---|---|---|---|
| 1 | ASA | Acrylic | 1.0 $lb/ft^3$ GPS | 10.0-60.0 | 71.3 | 180 |
| 2 | ASA | Acrylic | 1.0 $lb/ft^3$ GPS | 10.0-75.0 | 71.3 | 180 |
| 3 | ASA | Acrylic | 1.0 $lb/ft^3$ GPS | 10.0-65.0 | 71.3 | 180 |
| 4 | ASA | Acrylic | 1.25 $lb/ft^3$ GPS | 10.0-70.0 | 78.3 | 180 |
| 5 | ASA | Acrylic | 1.25 $lb/ft^3$ GPS | 10.0-70.0 | 78.3 | 180 |
| 6 | ASA | Acrylic | 1.25 $lb/ft^3$ GPS | 10.0-80.0 | 78.3 | 180 |
| 7 | ASA | Acrylic | 1.5 $lb/ft^3$ GPS | 10.0-75.0 | 67.3 | 180 |
| 8 | ASA | Acrylic | 1.5 $lb/ft^3$ GPS | 10.0-70.0 | 67.3 | 180 |
| 9 | ASA | Acrylic | 1.5 $lb/ft^3$ GPS | 10.0-55.0 | 67.3 | 180 |
| 10 | ASA | Acrylic | 1.5 $lb/ft^3$ GPS | 10.0-55.0 | 67.3 | 180 |

Workability

Samples of the panel assembly 100 with the composition of the one or more substrate layers 11A described above were also subjected to impact testing to test their impact resistance. Each test was conducted in accordance with ASTM D4226-16. The results of such testing are provided in Table 3 below. As shown in the results below, all samples achieved a mean failure energy of greater than 35.0 in-lbf.

TABLE 3

Impact Test Results.

| Sample | Impact Modifier | Backing Material | Total Number of Impacts | Mean Failure Energy (in-lbf) |
|---|---|---|---|---|
| A | Acrylic | 1.0 $lb/ft^3$ GPS | 21 | 67.0 |
| B | Acrylic | 1.0 $lb/ft^3$ GPS | 21 | 51.2 |
| A | Acrylic | 1.25 $lb/ft^3$ GPS | 21 | 63.3 |
| B | Acrylic | 1.25 $lb/ft^3$ GPS | 21 | 66.5 |
| A | Acrylic | 1.5 $lb/ft^3$ GPS | 21 | 59.3 |
| B | Acrylic | 1.5 $lb/ft^3$ GPS | 21 | 57.6 |
| A | CPE | 1.0 $lb/ft^3$ GPS | 21 | 57.5 |
| B | CPE | 1.0 $lb/ft^3$ GPS | 21 | 72.9 |

Advantageously, siding panel assemblies, such as the siding panel assembly 100, have improved workability characteristics, including impact resistance. For example, the siding panel assemblies can be carried, handled, and installed (e.g., cut with tin snips during installation) even at relatively cold temperatures down to about 8 deg F. without failing (e.g., chipping, breaking, shattering, disintegrating), such as when struck during installation (e.g., miss-hit with a hammer when nailing the nail hem 40 during installation). FIG. 5 shows a schematic partial view of one method of assembling three siding panel assemblies 100 coupled to each other in a row. Each of the siding panel assemblies 100A, 100B, 100C can have overhang portions 17A, 17B, 17C, each similar to the overhang portion 17 described above. When installed, the overhang portion of one siding panel can extend over the adjacent siding panel, whose overhand portion extends under the first siding panel. As shown in FIGS. 5A-5C, the siding panel assembly 100A has overhang portion 17A that extends over a portion (e.g., straight edge portion) of the siding panel assembly 100B, and an overhang portion 17B that extends over a portion (e.g., straight edge portion) of the siding panel assembly 100C.

Installation

FIG. 5 shows a schematic partial view of one method of assembling three siding panel assemblies 100 coupled to each other in a row. In the illustrated implementation, each of the siding panel assemblies 100A, 100B, 100C can have overhang portions or notches 17A, 17B, 17C, each similar to the overhang portion 17 described above. When installed, the overhang portion of one siding panel can extend over the adjacent siding panel, whose overhand portion extends under the first siding panel. As shown in FIGS. 5A-5C, the siding panel assembly 100A has overhang portion 17A that extends over a portion (e.g., straight edge portion) of the siding panel assembly 100B, and an overhang portion 17B that extends over a portion (e.g., straight edge portion) of the siding panel assembly 100C.

Figure 6B:
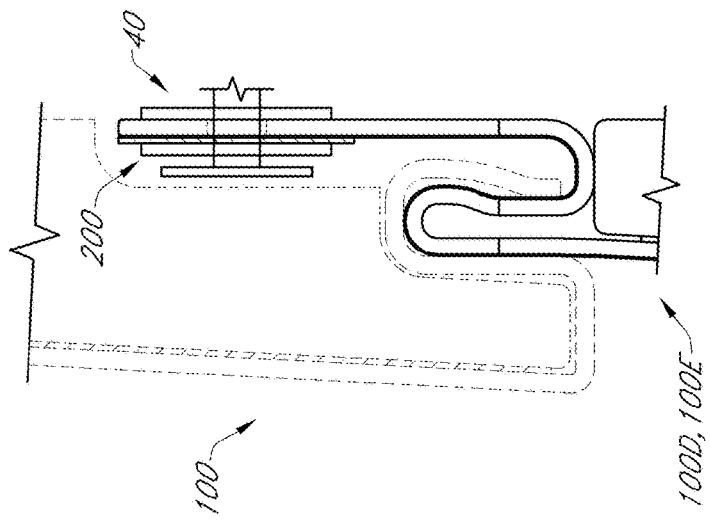
FIG. 6B is a schematic side view of the assembly in FIG. 6A.
Figure 6A:
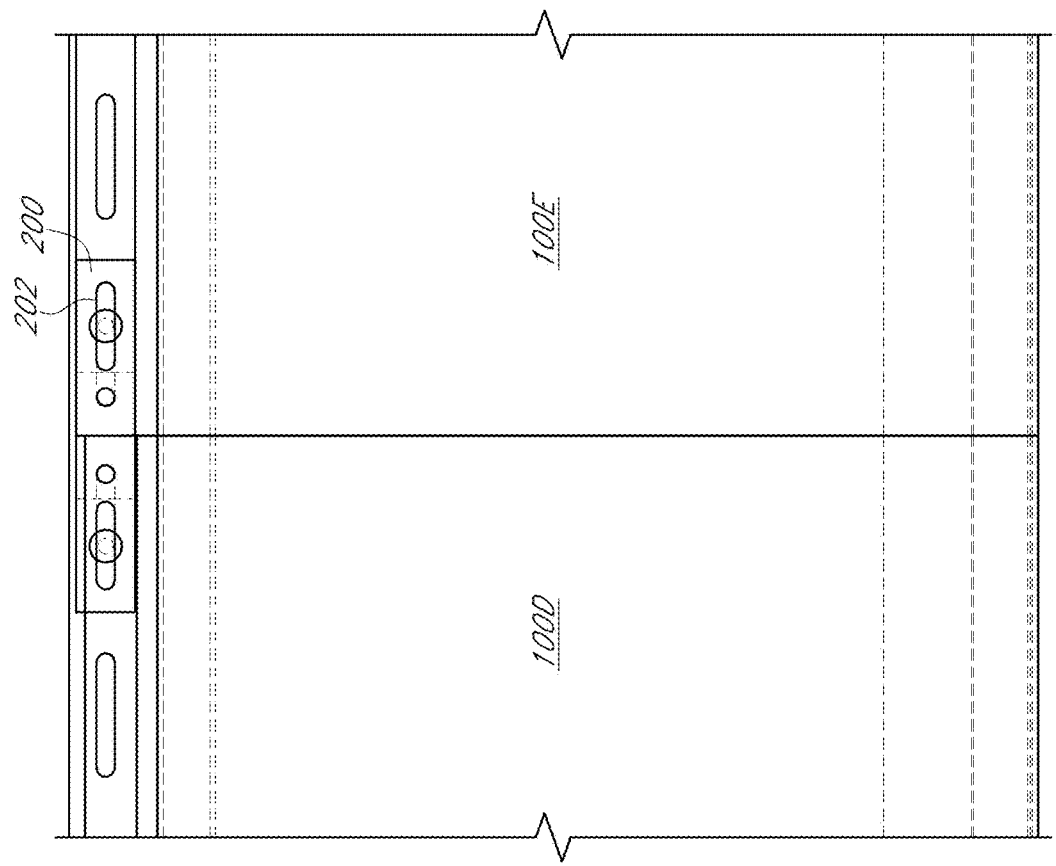
FIG. 6A is a schematic front view of a pair of siding panels side by side in a row.

FIGS. 6A-6B show a schematic partial view of another method of assembling adjacent siding panels 100D, 100E. In the illustrated implementation, the siding panels 100D, 100E are arranged so that their edges abut each other. As described above, the siding panel assemblies 100D, 100E exclude the overhang portion (e.g., overhang portion or notch 17 in FIG. 1), allowing the full edge of the siding panel 100D to abut the full edge of the siding panel 100E. A clip 200 having openings 202 is optionally placed across at least a portion of the nail hem 40 of both siding panel assemblies 100D, 100E, such that the openings 202 overlap with at least a portion of the openings 49. The nails are then inserted through the overlapping openings 202, 49 to thereby couple the clip 200 to the adjacent siding panel assemblies 100D, 100E. Advantageously, the clip 200 is low profile and allows the next row of siding panels to be installed over the siding panel assemblies 100D, 100E, thereby concealing the nail hem 40 and clip 200 (see FIG. 4B). Advantageously, the clip 200 holds the siding panel assemblies 100D, 100E tight (e.g., at their seam) and allows the siding panel assemblies 100D, 100E to expand and contract (e.g., when exposed to hot or cold temperatures) as one integral panel assembly.

FIGS. 7-7C shows installation of several siding panel assemblies 100A-100E, one above another, and coupled to each other as previously described. Advantageously, the design of the siding panel assembly 100, as described above, allows each siding panel 100B-100E to be installed over the previous siding panel assembly 100A-100D substantially vertically. That is, once the first siding panel assembly 100A is installed (e.g., nails nailed through the nail hem 40 to mount it to the wall W, the next siding panel assembly 100B can be placed against the wall W and slid down (e.g., dropped down) onto the top of the first panel assembly 100A (e.g., so that the buttlock portion 30 of the second siding panel assembly 100B extends over and couples to the U-shaped wall portion 24 of the first siding panel assembly 100A). This facilitates installation of the siding panel assemblies and does not require each siding panel assembly to be installed at an angle and then snapped into place over the previous siding panel assembly.

As discussed above, the overhang portion or notch 17 has a width L3 of approximately 0.75 inches, which advantageously reduces the amount of the panel 10 that is not supported by the backing panel 50. An adjacent panel assembly 100 can be positioned so that its end extends under the overhang portion or notch 17. In one implementation, said end of the adjacent panel assembly 100 can be up to about ¼ inches apart from the backing panel 50 of the adjacent panel assembly 100. In contrast, typical vinyl siding panel assemblies have a notch of about 1.5 inches and require that the adjacent siding panel extend underneath the notch and between the siding panel and insulation material of the adjacent panel, which causes the exterior panel to bulge out.

Figure 8A:
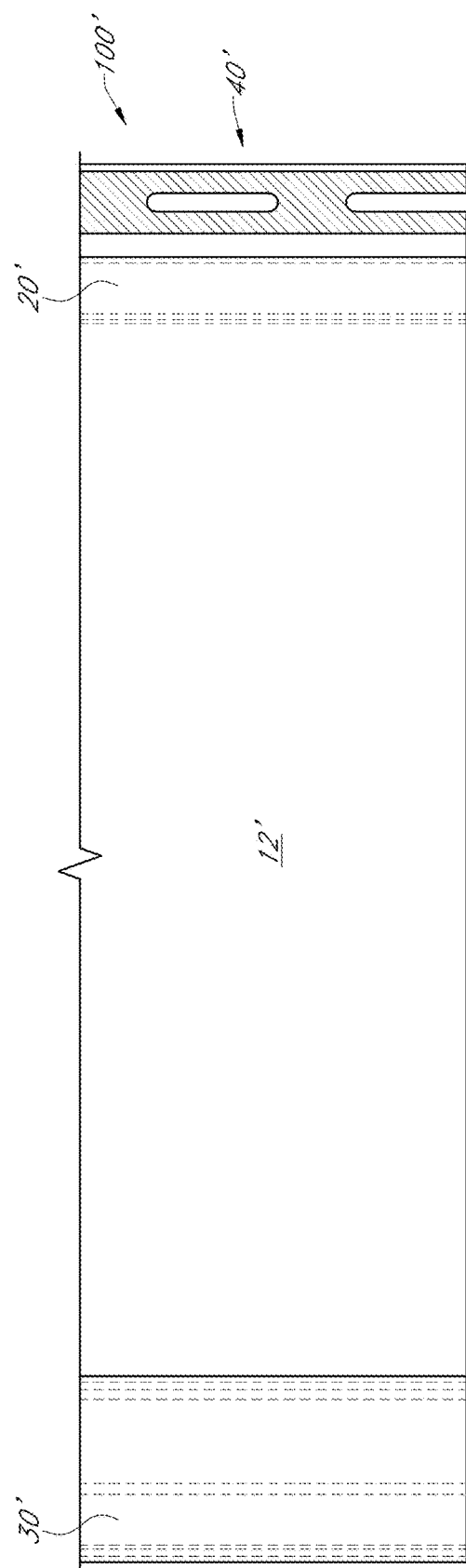
FIG. 8A-8B are schematic partial top and side views of a siding panel.
Figure 8B:
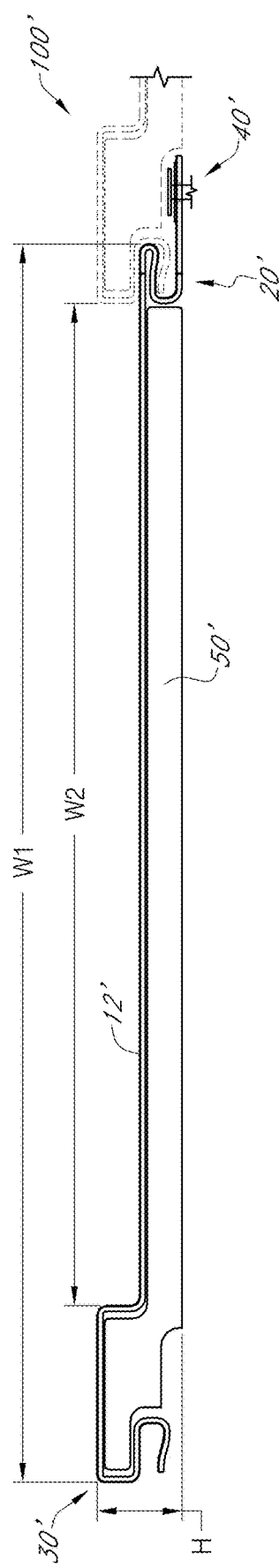

FIGS. 8A-8B shows a siding panel assembly 100'. Some of the features of the siding panel assembly 100' are similar to features in the siding panel assembly 100 of FIGS. 1-4. Thus, references numerals used to designate the various components of the siding panel assembly 100 are identical to those used for identifying the corresponding components of the siding panel assembly 100' in FIGS. 8A-8B, except that a "'" is added to the numerical identifier. Therefore, the structure and description for the various components of the siding panel assembly 100 in FIGS. 1-4 is understood to also apply to the corresponding components of the siding panel assembly 100' in FIGS. 8A-8B, except as described below.

The siding panel assembly 100' is a vertical siding panel (e.g., Board and Batten) that can be installed vertically on a wall. The siding panel assembly 100' can have a siding panel 10' and optionally have a backing panel 50' made of the materials discussed above for the siding panel assembly 100' and substantially the same CLTE, fire performance, wind performance and/or impact performance. The siding panel assembly 100' can have a width W1 of about twelve inches, with a course or face portion 12' with a forward facing (e.g., outer facing) surface 12a' approximately 10 inches in width W2. However, the width W1 of the siding panel assembly 100' and width W2 of the course or face portion 12' of the siding panel 10 can have other values. Additionally, the siding panel assembly 100' can have a low profile and an overall thickness H (from the wall on which it's mounted) of no more than about ¾ inches, allowing the siding panel assembly 100' to be used with standard accessories during installation.

Figure 9:
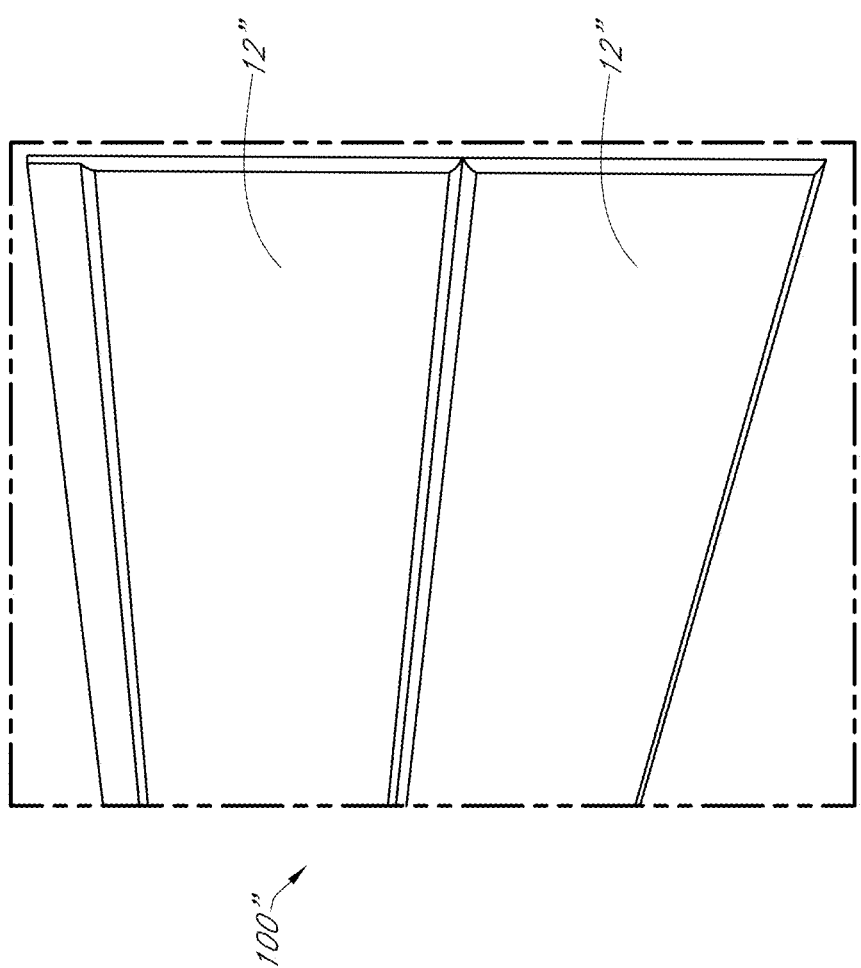
FIGS. 9-9A is a schematic view of a siding panel.
Figure 9A:
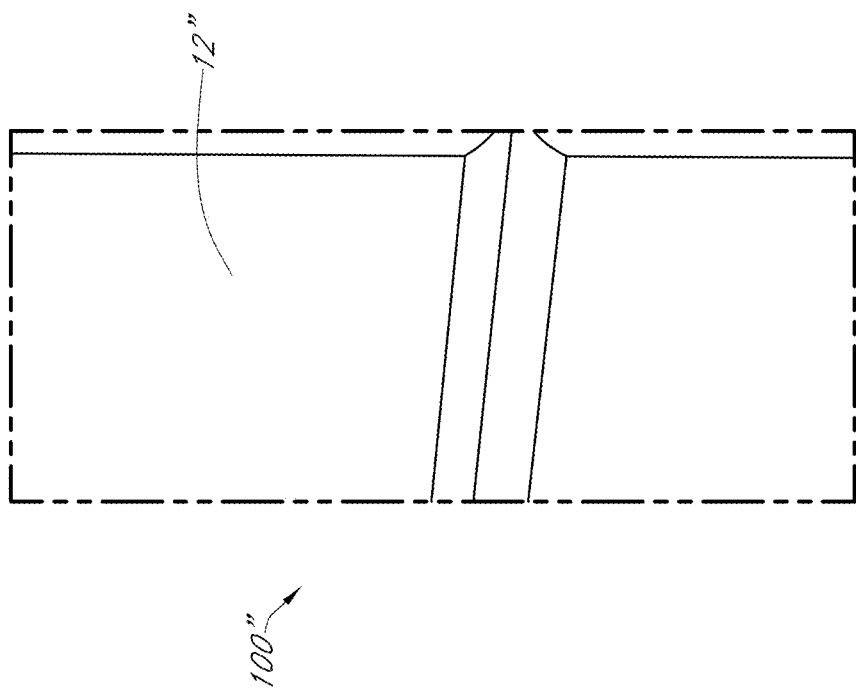

FIGS. 9-9A shows a siding panel assembly 100". Some of the features of the siding panel assembly 100" are similar to features in the siding panel assembly 100 of FIGS. 1-4. Thus, references numerals used to designate the various components of the siding panel assembly 100 are identical to those used for identifying the corresponding components of the siding panel assembly 100" in FIGS. 9-9A, except that a """ is added to the numerical identifier. Therefore, the structure and description for the various components of the siding panel assembly 100 in FIGS. 1-4 is understood to also apply to the corresponding components of the siding panel assembly 100" in FIGS. 9-9A, except as described below.

The siding panel 100" can have a siding panel 10" and optionally have a backing panel 50". The siding panel assembly 100" can have a planar (e.g., flat) profile with a V groove between panels 100", and can be horizontally installed. The siding panel assembly 100' can have a siding panel 10' and optionally have a backing panel 50' made of the materials discussed above for the siding panel assembly 100' and substantially the same CLTE, fire performance, wind performance and/or impact performance. Additionally, the siding panel assembly 100" can have a low profile and an overall thickness H (from the wall on which it's mounted) of no more than about ¾ inches, allowing the siding panel assembly 100' to be used with standard accessories during installation.

Advantageously, the siding panel assembly 100 is low profile and has a maximum thickness or projection H (from a wall it's installed on) of less than about ¾ inches, as discussed above. In one implementation, the maximum thickness or projection H (from a wall it's installed upon) is about 0.72 inches. This allows installation of the siding panel assembly 100 using standard readily available accessories (e.g., J-channel, inside corner post, outside corner post, cellular PVC trim, etc.).

Figure 10A:
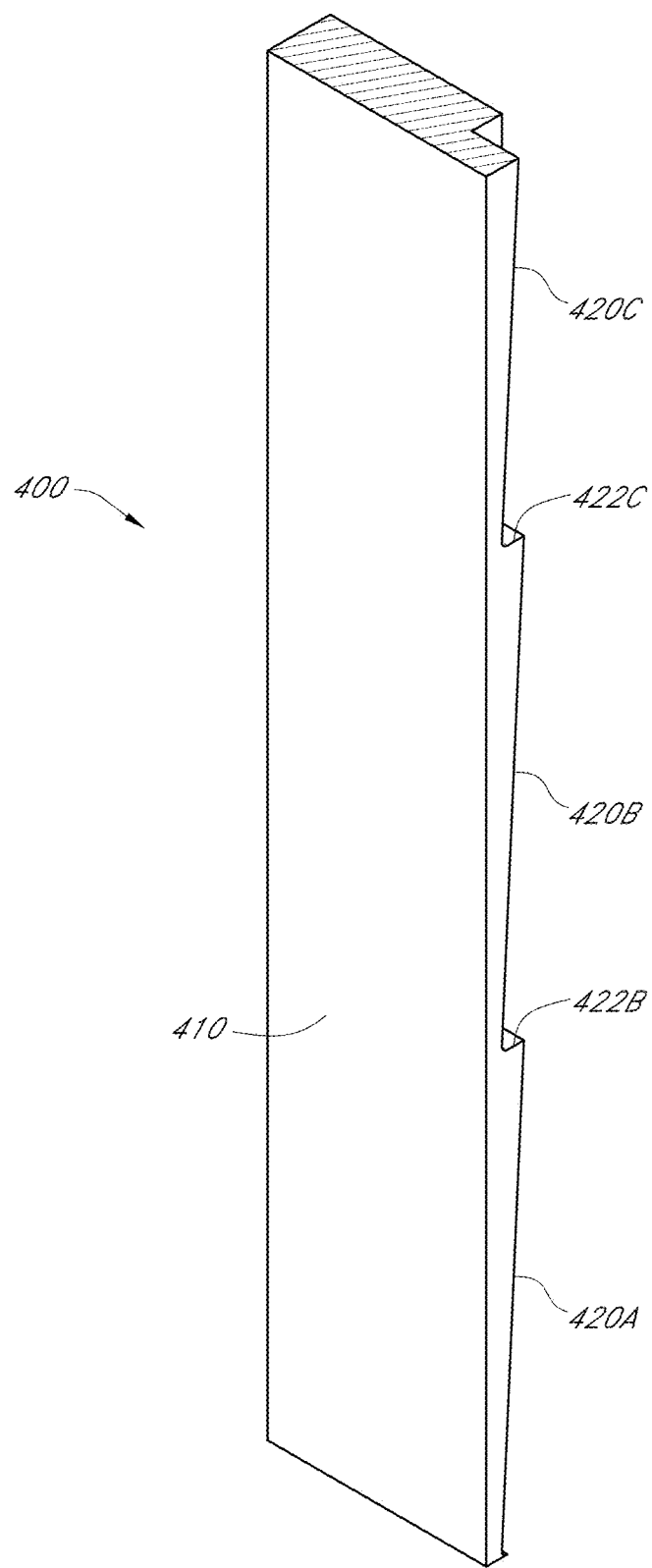
FIGS. 10A-10C are a schematic perspective front view, perspective rear view, and side view of a trim frame for use with the siding panel of FIGS. 1-7C.
Figure 10B:
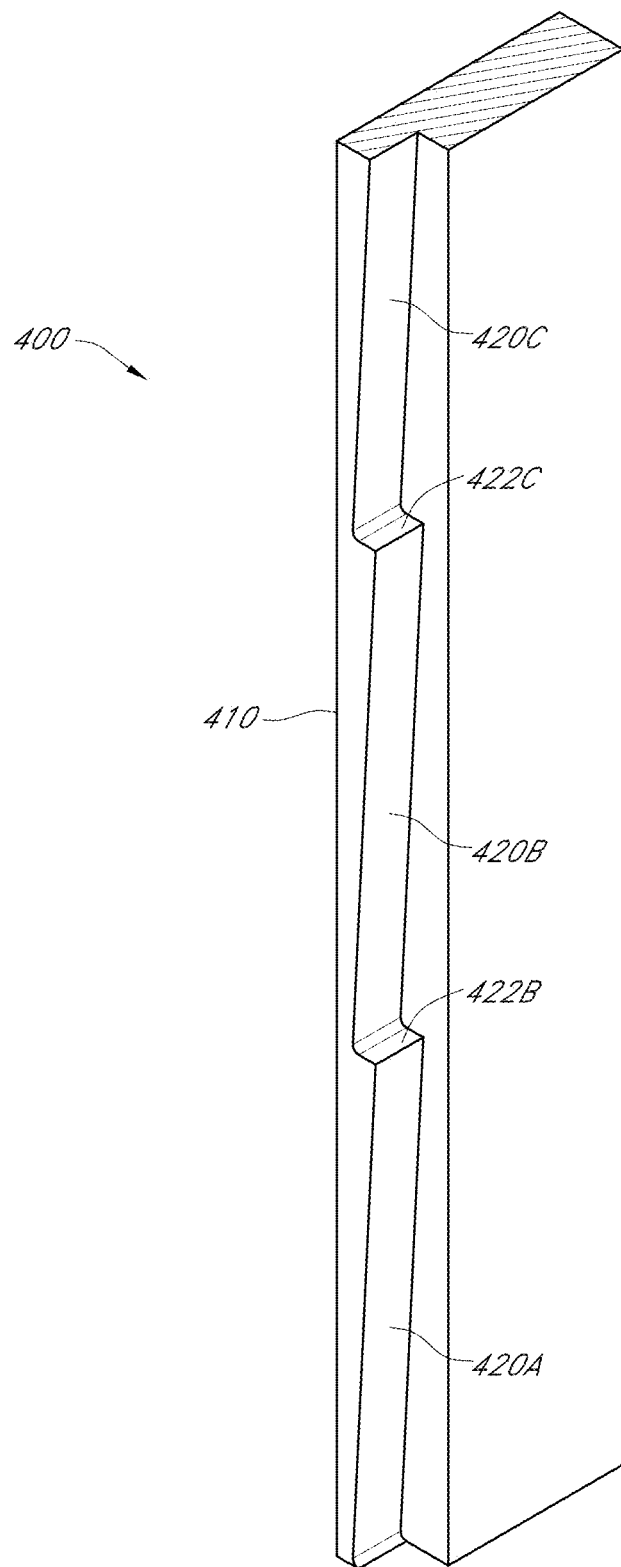
Figure 10C:
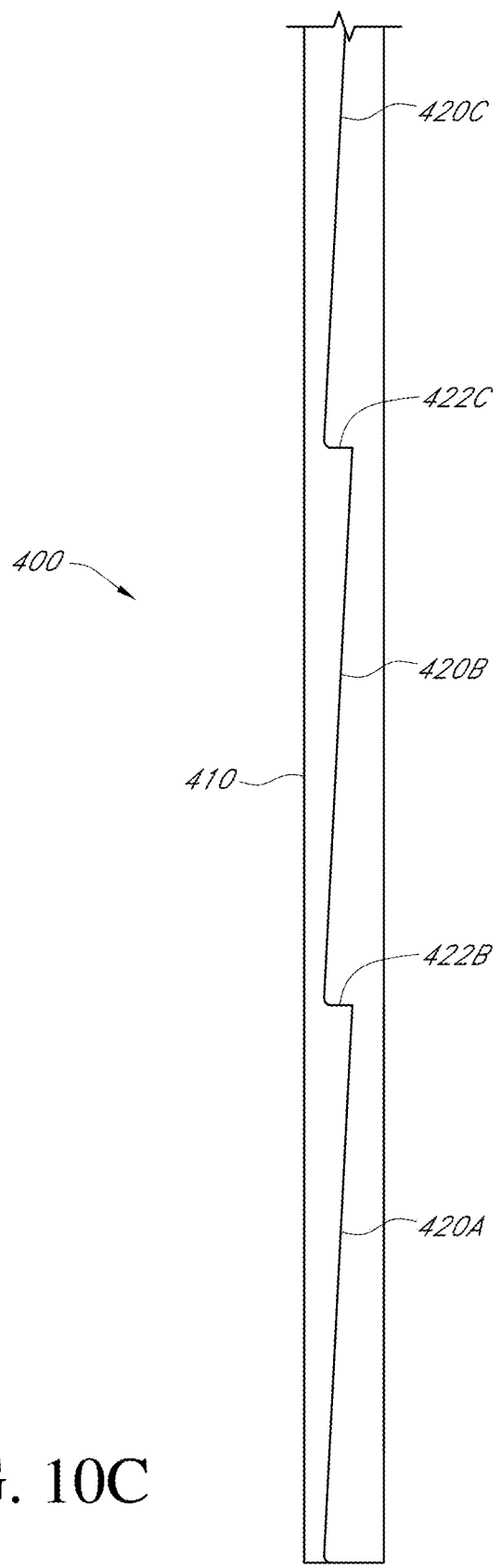
Figure 11:
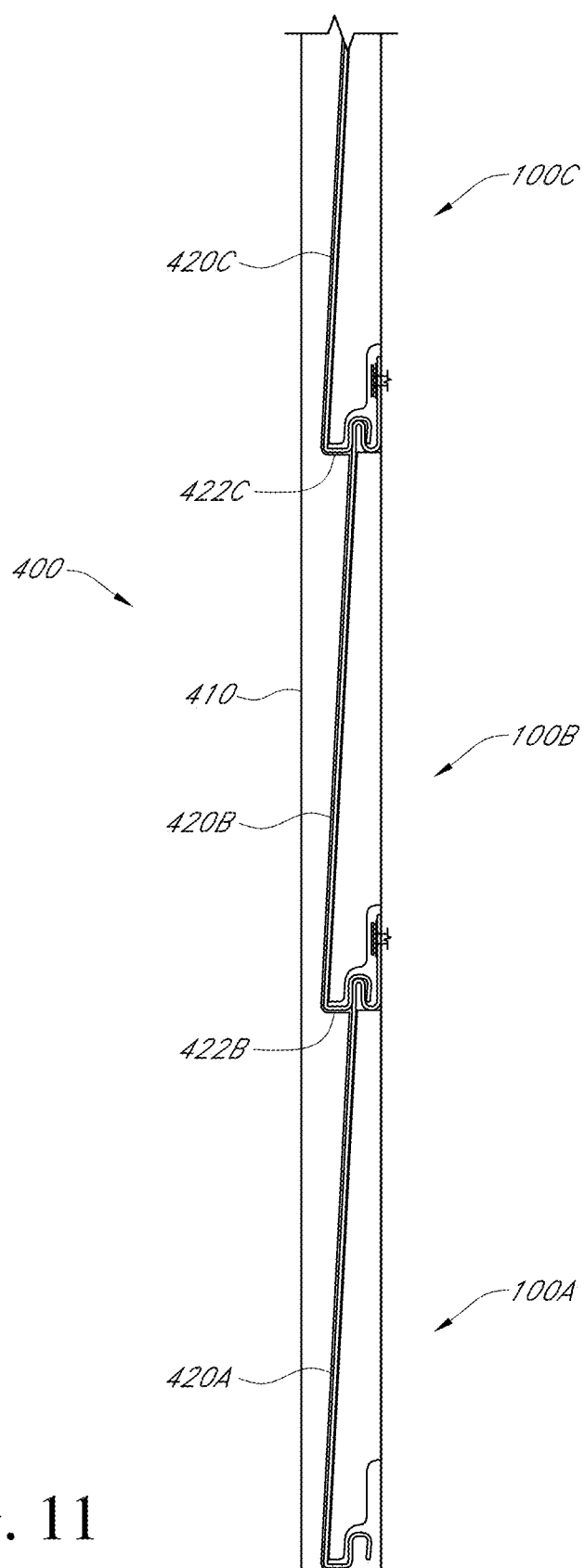
FIG. 11 is a side view of the trim frame disposed over a plurality of assembled siding panels of FIGS. 1-7C.

FIGS. 10A-10C show a trim accessory 400 that can be used (e.g., for inside corner posts, outside corner posts) to receive siding panel assemblies, such as the siding panel assembly 100 described above. The trim accessory 400 optionally has a substantially planar (e.g., flat) front surface 410 and a stepped rear surface defined by planar portions 420A, 420B, 420C separated by step portions 422A, 422B, 422C, so that the rear surface transitions from one planar portion 420A to another planar portion 420B via a stepped portion 422B. The planar portions 420A, 420B, 420C can be angled relative to the front surface 410 by approximately the same amount as the course surface 12a is relative to the bottom surface 52 of the backing panel 50. Additionally, the planar portions 420A, 420B, 420C optionally have a length approximately the same as the length L of the course surface 12a. Advantageously, the trim accessory 400 fits over the assembled siding panel assemblies 100A, 100B, 100C (as shown in FIG. 11) such that shadow areas at the ends of the siding panels (e.g., due to gaps between the trim accessory and siding panels) are reduced or eliminated. This structure also inhibits (e.g., prevents) intrusion of rain, wind, dirt, debris, insects or other contaminants between the trim accessory 400 and siding panels 100A, 100B, 100C, inhibiting such contaminants from getting behind the siding panels 100A, 100B, 100C, in another implementation, a seal (e.g., seal strip) can be provided between the rear surface of the trim accessory 400 and the siding panel assemblies 100A, 100B, 100C to further seal the space between them.

While certain embodiments of the invention have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Of course, the foregoing description is that of certain features, aspects and advantages of the present invention, to which various changes and modifications can be made without departing from the spirit and scope of the present invention. Moreover, the devices described herein need not feature all of the objects, advantages, features and aspects discussed above. Thus, for example, those of skill in the art will recognize that the invention can be embodied or carried out in a manner that achieves or optimizes one advantage or a group of advantages as taught herein without necessarily achieving other objects or advantages as may be taught or suggested herein. In addition, while a number of variations of the invention have been shown and described in detail, other modifications and methods of use, which are within the scope of this invention, will be readily apparent to those of skill in the art based upon this disclosure. It is contemplated that various combinations or subcombinations of these specific features and aspects of embodiments may be made and still fall within the scope of the invention. Accordingly, it should be understood that various features and aspects of the disclosed embodiments can be combined with or substituted for one another in order to form varying modes of the discussed devices.

What is claimed is:

1. A thermoplastic composite sheet for exterior cladding applications, comprising:
    an outer layer comprising a thermoplastic resin composition reinforced with a filler having an aspect ratio of at least 5 to 1 such that the outer layer has a coefficient of linear thermal expansion of no more than approximately $2.33 \times 10^{-5}$ in/in/deg F., wherein the filler is fiberglass in an amount of between 5% and 20% of the composition;
    a preformed backing panel bonded to the outer layer, the backing panel being substantially rigid and defined by a foam material; and
    a thermoset adhesive disposed between the outer layer and the backing panel to bond the backing panel to the outer layer,
    wherein the outer layer and the backing panel define a flat body having a flat outer surface, and wherein the thermoset adhesive maintains adhesion between the backing panel and the outer layer and the body maintains the flat outer surface when exposed to a temperature of between 180 degrees and 210 degrees Fahrenheit.

2. The composite sheet of claim 1, wherein the filler is randomly distributed in the thermoplastic resin.

3. The composite sheet of claim 1, wherein the thermoplastic resin is Poly(vinyl chloride).

4. The composite sheet of claim wherein filler has an aspect ratio of at least 10 to 1.

5. The composite sheet of claim 1, wherein the foam material is chosen from the group consisting of polyvinyl chloride (PVC) foam, expanded polystyrene (EPS) foam, graphite poly styrene (GPS) foam, extruded polystyrene (XPS) foam, polyurethane foam, and polypropylene foam.

6. The composite sheet of claim 5, wherein the foam material has a density between 0.75 lb/ft$^3$ and 2.10 lb/ft$^3$.

7. The composite sheet of claim 1, wherein the adhesive is a crosslinked polyurethane (PUR) adhesive.

8. The composite sheet of claim 1, wherein the adhesive is configured to maintain adhesion between the backing panel and the outer layer, and the body maintains the substantially planar profile, under outdoor exposure to sunlight.

9. The composite sheet of claim 1, wherein the fiber further comprises Wollastonite in an amount of between 10% and 80% of the composition.

10. A thermoplastic composite sheet for exterior cladding applications, comprising:
    an outer layer comprising a Poly(vinyl chloride) thermoplastic resin composition reinforced with a filler having an aspect ratio of at least 5 to 1 such that the outer layer has a coefficient of linear thermal expansion of no more than approximately $2.33 \times 10^{"5}$ in/in/deg F., wherein the filler is fiberglass in an amount of between 5% and 20% of the composition;
    a preformed backing panel attached to the outer layer, the hacking panel defined by a foam material and being substantially rigid; and
    a thermoset adhesive disposed between the outer layer and the backing panel to bond the backing panel to the outer layer,
    wherein the outer layer and the backing panel define a flat body having a flat outer surface, and wherein the thermoset adhesive maintains adhesion between the backing panel and the outer layer and the body maintains the flat outer surface when exposed to a temperature of between 180 degrees and 210 degrees Fahrenheit.

11. The composite sheet of claim 10, wherein the filler is randomly distributed in the thermoplastic resin.

12. The composite sheet of claim 10, wherein the foam material is chosen from the group consisting of polyvinyl chloride (PVC) foam, expanded polystyrene (EPS) foam, graphite poly styrene (GPS) foam, extruded polystyrene (XPS) foam, polyurethane foam, and polypropylene foam.

13. The composite sheet of claim 12, wherein the foam material has a density between 0.75 lb/ft$^3$ and 1.5 lb/ft$^3$.

14. The composite sheet of claim 10, wherein the adhesive is a crosslinked polyurethane (PUR) adhesive.

15. The composite sheet of claim 10, wherein the adhesive is configured to maintain adhesion between the backing panel and the outer layer, and the body maintains the substantially planar profile, under outdoor exposure to sunlight.

16. The composite sheet of claim 10, wherein the fiber further comprises Wollastonite in an amount of between 10% and 80% of the composition.

* * * * *

UNITED STATES PATENT AND TRADEMARK OFFICE
CERTIFICATE OF CORRECTION

PATENT NO. : 10,590,658 B1
APPLICATION NO. : 16/283598
DATED : March 17, 2020
INVENTOR(S) : Charles Bryan Moses, Jr.

It is certified that error appears in the above-identified patent and that said Letters Patent is hereby corrected as shown below:

On the Title Page

In Column 2, item (57), Abstract, Line 8, delete "backing later" and insert -- backing layer --.

In the Specification

In Column 4, Line 25, delete "16)." and insert -- 16. --.

In Column 8, Line 18, delete "(e.g.," and insert -- e.g., --.

In Column 8, Line 19, delete "(e.g.," and insert -- e.g., --.

In Column 13, Line 62, delete "(e.g.," and insert -- e.g., --.

In the Claims

In Column 18, Line 16, Claim 4, delete "wherein" and insert -- 1, wherein the --.

In Column 18, Line 21, Claim 5, delete "poly styrene" and insert -- polystyrene --.

In Column 18, Line 32, Claim 9, delete "fiber" and insert -- filler --.

In Column 18, Line 41, Claim 10, delete "$2.33 \times 10^{"5}$" and insert -- $2.33 \times 10^{-5}$ --.

In Column 18, Line 45, Claim 10, delete "hacking" and insert -- backing --.

In Column 18, Line 62, Claim 12, delete "poly styrene" and insert -- polystyrene --.

In Column 19, Line 6, Claim 16, delete "fiber" and insert -- filler --.

Signed and Sealed this
Nineteenth Day of September, 2023

*Katherine Kelly Vidal*

Katherine Kelly Vidal
*Director of the United States Patent and Trademark Office*